United States Patent
Wang et al.

(10) Patent No.: US 11,861,546 B1
(45) Date of Patent: Jan. 2, 2024

(54) LOCATION-BASED PACKAGE DROP-OFF INSTRUCTIONS

(71) Applicant: Amazon Technologies, Inc., Seattle, WA (US)

(72) Inventors: Zheng Wang, Sammamish, WA (US); Karthik Ram Srinivasan, Bellevue, WA (US); Bettina Cornelia Sehorsch, New York, NY (US); Shao-Wen Yang, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 479 days.

(21) Appl. No.: 17/031,682

(22) Filed: Sep. 24, 2020

(51) Int. Cl.
*G06Q 10/0832* (2023.01)
*G06Q 10/0833* (2023.01)
*G06V 20/20* (2022.01)
*G06N 20/00* (2019.01)

(52) U.S. Cl.
CPC ..... *G06Q 10/0832* (2013.01); *G06Q 10/0833* (2013.01); *G06V 20/20* (2022.01); *G06N 20/00* (2019.01)

(58) Field of Classification Search
CPC ........... G06Q 10/0832; G06Q 10/0833; G06V 20/20; G06N 20/00
USPC ........................................................ 705/338
See application file for complete search history.

(56) References Cited

U.S. PATENT DOCUMENTS

| | | | |
|---|---|---|---|
| 9,743,239 B1 * | 8/2017 | Mishra | H04W 4/023 |
| 10,262,290 B1 * | 4/2019 | Mossoba | G06V 10/7715 |
| 10,373,377 B1 * | 8/2019 | Niewiadomski | G01C 21/3697 |
| 2008/0255758 A1 * | 10/2008 | Graham | G06Q 10/0833 |
| | | | 701/469 |
| 2015/0066799 A1 | 3/2015 | Scipioni | |
| 2015/0302495 A1 * | 10/2015 | Stuckman | G01S 1/7034 |
| | | | 705/26.35 |
| 2016/0292635 A1 | 10/2016 | Todasco | |
| 2017/0011254 A1 * | 1/2017 | Guo | G06Q 30/0639 |
| 2017/0236091 A1 | 8/2017 | Putcha et al. | |
| 2019/0043004 A1 * | 2/2019 | Lesieur | G06Q 10/087 |
| 2019/0161190 A1 * | 5/2019 | Gil | B65G 1/0435 |
| 2020/0279208 A1 * | 9/2020 | Kumar | G06V 10/245 |

(Continued)

OTHER PUBLICATIONS

United States Postal Service, "Seeing the Future: Augmented Reality and the Postal Service" RARC Report, Apr. 6, 2015, p. 1-20. (Year: 2015).*

(Continued)

*Primary Examiner* — Jeff Zimmerman
*Assistant Examiner* — Brian A Tallman
(74) *Attorney, Agent, or Firm* — Lee & Hayes P.C.

(57) ABSTRACT

A system can be configured to receive and analyze an image captured by a user device at a delivery location. The system can utilize local algorithms tailored to the delivery location to confirm that the delivery location is the intended delivery location for a package. The system can utilize global algorithms to generate three-dimensional models of the delivery environment and an augmented reality interface providing delivery instructions to the deliverer. The delivery instructions include indications of approved delivery locations and rejected delivery locations associated with the general delivery location of the customer. The delivery instructions and the user device can be utilized to ensure package placement for secure delivery to a customer.

20 Claims, 7 Drawing Sheets

(56) References Cited

U.S. PATENT DOCUMENTS

| | | | |
|---|---|---|---|
| 2021/0406825 A1* | 12/2021 | Lee | G06Q 10/08355 |
| 2022/0027845 A1* | 1/2022 | Silverstein | G06Q 10/0832 |
| 2022/0083964 A1 | 3/2022 | Silverstein et al. | |
| 2022/0180282 A1 | 6/2022 | Powell et al. | |
| 2022/0222449 A1* | 7/2022 | Zotto | H04N 7/15 |

OTHER PUBLICATIONS

Office Action for U.S. Appl. No. 17/208,944, dated Feb. 22, 2023, Inventor #1 Chengeng Zeng, "Location-Based Package Visual Delivery Instructions", 28 pages.

* cited by examiner

LOCATION-BASED PACKAGE DROP-OFF INSTRUCTIONS

BACKGROUND

Presently, delivery of customer packages to a delivery location associated with the customer is accomplished through an individual navigating to the delivery location, identifying a drop-off location at the delivery location, and leaving the customer package at the drop-off location. However, as navigation software only directs the individual to the general location of the delivery location, the identification of the true delivery location and acceptable drop-off locations at the delivery location is left to the individual to identify. Accordingly, many delivery defects are caused by the customer package being placed at a drop-off location that is not associated with the delivery location such as at a neighboring address or at a non-safe location at the delivery location. Such delivery defects result in customer packages not being received by the customer and being marked as delivered not received, inflicting both concession costs for correcting the error for the customer and negative public opinion regarding the reliability of the business.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
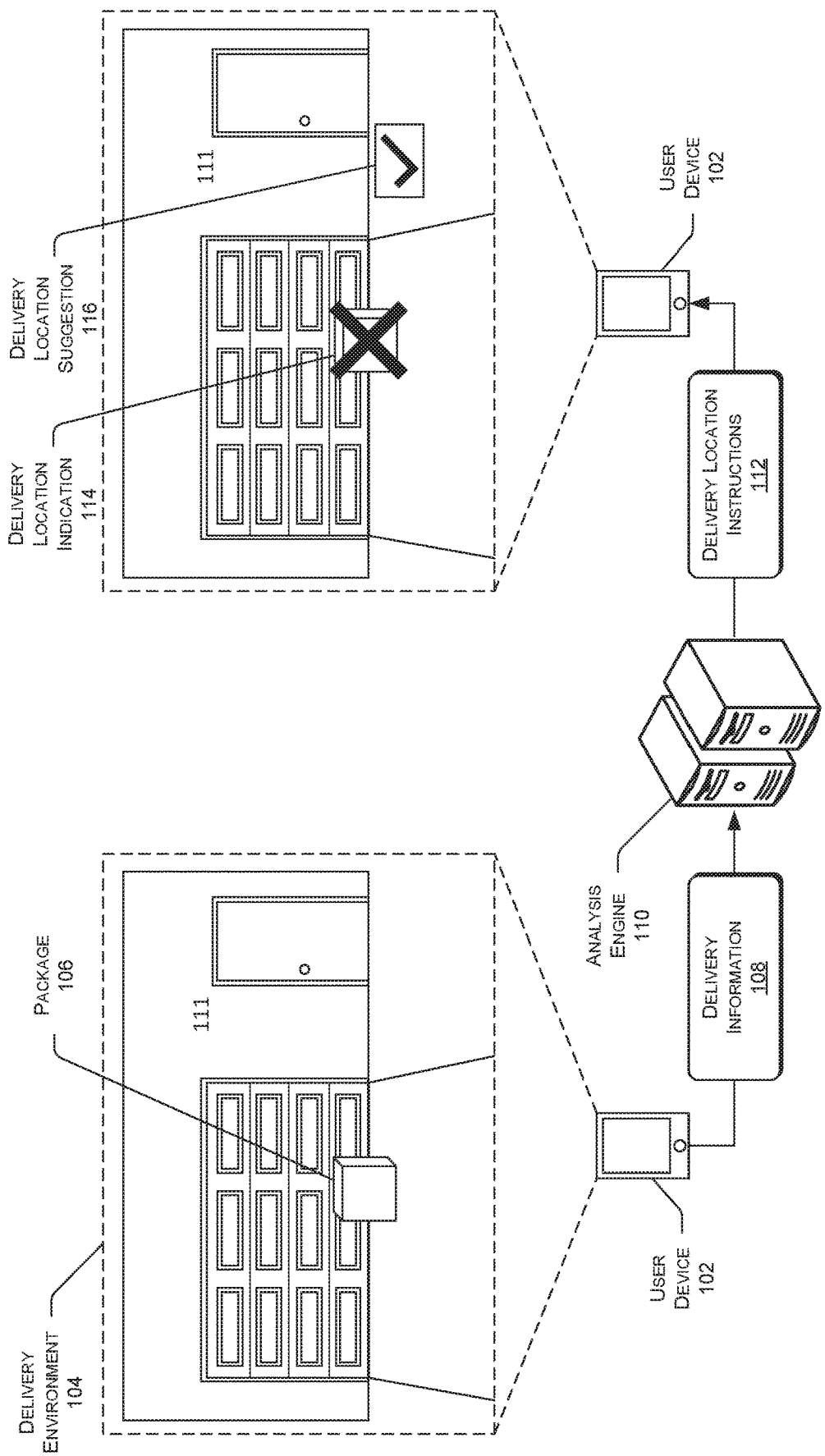
FIG. 1 illustrates an example delivery environment for determining whether delivery of a package has been successfully completed at a delivery location and verifying package placement at the delivery location.

Described herein are techniques for providing delivery confirmation regarding the placement of packages at delivery locations. In some embodiments, the techniques can be utilized to generate interactive visual guidance that assists deliverers (e.g., individuals who are responsible for delivery of packages to delivery locations of customers) while the deliverers are identifying drop-off locations at the delivery locations of the customers. In particular, a deliverer may capture images, video, or other location information upon arrival to an area surrounding a delivery location. Additionally, location information associated with the delivery information can be analyzed according to the described techniques to assist identification of the delivery location by the deliverer. Further, the location information can be analyzed and utilized to generate indications of appropriate or approved drop-off locations for the customer package(s), package drop-off location approval (before or after placement), package drop-off location rejection (before or after placement), and rejected or disapproved drop-off locations. Accordingly, verification of both delivery location and package placement within the delivery location can increase the number of successful package deliveries and reduce the number of packages that are actually delivered but not received by customers.

In some embodiments, the techniques described herein enable a deliverer to obtain assistance in delivering a package for a customer to a safe location where the customer can later obtain the package at their discretion. In particular, through the utilization of a user device (or a deliverer device), a deliverer can be provided with an interface that provides accurate package placement information that is tailored to the customer associated with the package and/or the location in which the package is being delivered. The deliverer can receive the guidance provided by the described techniques through alerts, notifications, user interface elements, and other communication pathways utilizing the user device associated with the driver. In some embodiments, the user interface can include an augmented reality interface configured to provide one or more indications of package placement locations, locations to be avoided, safe drop-off locations, unsafe drop-off locations, and other indications that provide delivery location specific information to the deliverer. Additionally, in some embodiments, the deliverer can provide location information and receive guidance in real-time upon arriving to an area surrounding the delivery destination associated with the customer. It should be noted that while the deliverer is commonly referred to as an individual and/or a human, the deliverer does not need to be human. In at least one embodiment, the deliverer can be an unmanned aerial vehicle (UAV), a ground-based delivery robot, or another autonomous/semi-autonomous entity configured to deliver a package to a delivery location of a customer. For instance, delivery of a package may be automated and controlled by the delivery instructions and/or a computing device that generates the delivery instructions, determined in an analysis environment, and transmitted to the deliverer. Additionally, the analysis environment can determine whether the autonomous delivered has placed the package in a rejected drop-off location and transmit additional instructions that cause the autonomous deliverer to relocate the package to an approved drop-off location.

In some embodiments, the techniques described herein further verify package placement at the delivery location associated with the customer. As noted above, a user device associated with the deliverer can provide location information associated with an area surrounding the delivery location. The area can include other houses that are nearby a house of the customer, an apartment building that include numerous residences besides the residence of the customer, and other environments that are located at the general area surrounding the delivery location where the package is to be delivered. It should be noted that, while global positioning systems, navigation tools, and other guidance systems can be capable of directing a deliverer to the general area associated with a delivery location and/or a customer, such guidance systems may struggle to ensure that the package is actually delivered to an appropriate drop-off location for the customer. Accordingly, the location information received from the user device can be utilized to identify appropriate drop-off locations while preventing the package from being placed at inappropriate drop-off locations. Further, the user device can be utilized to confirm placement of the package at the delivery location for both the deliverer and the customer.

In some embodiments, the described techniques can utilize machine learning algorithms and/or other artificial intelligence (AI) techniques (e.g., neural networks) to analyze location information and generate the interactive visual (or audible) guidance displayed (or audibly output) for the deliverer. In particular, machine learning algorithms (or other AI techniques) can be utilized to identify an area associated with the delivery location and determine that the package is placed in an approved drop-off location. For instance, one or more delivers can be instructed or otherwise caused to capture location information associated with a delivery location when completing one or more deliveries at the delivery location. Additionally, the results of the one or more deliveries can be tracked and associated with the location information captured by the one or more delivers at the delivery location. Alternatively, or in addition, one or more customers can provide location information associated with the delivery location including indications of appropriate or approved drop-off locations and inappropriate or disapproved drop-off locations for packages. Further, the location information, customer indications regarding the drop-off locations, delivery results (e.g., customer received package, package was delivered not received, customer reported a complaint with the delivery, etc.), and other delivery information can be associated within a database. The location information and delivery information associated with the delivery location can be analyzed and utilized to confirm package placement at the delivery location and ensure that packages are effectively delivered to customers.

In some embodiments, a user device associated with the deliverer can be utilized to verify package placement at the delivery location. In particular, the user device can be utilized to capture images, video, and other location information associated with an area that the deliverer has been directed to for package delivery. Additionally, the user device or a server associated with the user device can receive the captured images and location information during and after delivery of the package to verify that the package has been delivered to the delivery location and that the package has been correctly delivered to an acceptable drop-off location. For instance, the algorithms can receive one or more images of the delivery location and/or the package placed at the delivery location. Further, the algorithms can analyze the one or more images and identify unique features within those images and compare those unique features to known features that have been recorded for the delivery location in the past. From the comparison of the unique features captured in the one or more images and the known features associated with the delivery location, the algorithm can verify the delivery location and confirm that the package is being placed at the correct delivery location. Additionally, in some additional embodiments, the one or more images can depict the package placed at the delivery location. Accordingly, the algorithms can determine whether the placement of the package at the delivery location satisfies one or more delivery criterion or whether the package is to be relocated at the delivery location.

Currently, delivery confirmation guidelines are provided to deliverers based on a location associated with the deliverer. For instance, a user device associated with a deliverer (e.g., a driver or other personnel tasked with delivering a package) can utilize GPS geofencing and WiFi fingerprinting to guide and/or place a deliverer, at best, within a general area of the delivery location (e.g., approximately ten meters of a delivery location). While the delivery confirmation guidelines based on the location of the deliverer reduce the rate of packages that are actually delivered but are not received by customers, the delivery confirmation guidelines based on the location of the deliverer remain flawed. Deliverers, upon arrival at a delivery location, attempt to identify the correct location where the package is to be left. However, due to the manual location of placement locations, deliverers can easily place a package meant for a customer at a delivery location in a separate location that is associated with a different delivery location/customer or in a location that does not effectively prevent the package from being stolen/ exposes the package to unnecessary risk of theft. Additionally, these issues may be exacerbated in areas having high population density (e.g., cities, apartment buildings, etc.), fewer security measures (e.g., unsecured communities, low light environments, little to no security surveillance, etc.), and/or areas lacking sufficient identification of delivery locations (e.g., duplex homes with obscured addresses, unmarked/difficult to identify doors in apartment buildings, etc.). Development of a database for training algorithms to efficiently identify packages and delivery locations enable a driver to be provided with real-time instructions and adjustments to package drop-off locations to avoid the problems inherent in manual delivery location identification. Accordingly, the described systems and methods allow for the identification of appropriate and inappropriate delivery locations that can be utilized as guidance for a driver attempting to deliver a package to a customer. Further, the described systems and methods enable package placement verification, on-site and during delivery of the package, to ensure that risk related to the package is reduced.

FIG. 1 illustrates an example delivery environment for determining whether delivery of a package has been successfully completed at a delivery location. In particular, FIG. 1 illustrates a user device 102 that can be utilized to capture location information related to a delivery environment 104 and a package 106. Additionally, the location information and other information associated with the delivery can be transmitted, as delivery information 108, to an analysis engine 110. Further, the analysis engine 110 can be configured to generate one or more delivery location instructions 112 based on the delivery information 108. The delivery location instructions 112 can be displayed by a user interface associated with the user device 102 to provide a delivery location indication 114 and/or a delivery location suggestion 116. It should be noted that, while FIG. 1 depicts a particular delivery environment 104, a package 106, a delivery location indication 114, and a delivery location suggestion 116, the delivery information 108 can include additional images of the delivery environment 104, the package 106, and the area surrounding the delivery environment 104. Similarly, the delivery location indication 114 and the delivery location suggestion 116 can be individually omitted or replaced with alternative delivery location indications and alternative delivery location suggestions.

In some embodiments, a deliverer can cause a user device 102 to capture location information associated with a delivery environment 104. The delivery environment 104 can include a structure, for example a residence (e.g., house) or an establishment (e.g., building associated with a business), that is associated with a customer that has placed an order for one or more items to be delivered. Alternatively, or in addition, the delivery environment 104 can include an entry way to a portion of a building (e.g., an apartment), an area external to a building (e.g., a driveway, sidewalk, porch, etc.), or other delivery location that is associated with the customer, but not necessarily a building or a structure. In at least one embodiment, the user device 102 can provide instructions regarding one or more features of the delivery location that should be captured via the user device 102. For instance, the user device 102 can cause the deliverer to capture location information from a defined perspective (e.g., a view of a building from the street, internal images of an apartment building, etc.), at a distance from the delivery location, and/or after one or more steps of the delivery have been completed (e.g., after the package 106 has been placed for delivery). Alternatively, the deliverer can cause the user device 102 to capture location information associated with the delivery environment 104 at the discretion of the deliverer.

In some embodiments, the user device 102 can generate delivery information 108 from the location information associated with the delivery environment 104 and/or one or more indications generated by the user device 102. In particular, the delivery information 108 can include an indication of a location at which the deliverer has arrived, such as a global positioning system (GPS) location determined by the user device 102. Alternatively, or in addition, the delivery information 108 can include one or more user inputs provided by the deliverer via a user interface of the user device 102. The delivery information 108 can be provided to an analysis engine 110 configured to determine whether the package 106 has been or will be placed at the delivery location associated with the customer and that the package 106 has been placed at an approved drop-off location.

In some embodiments, the analysis engine 110 can determine, based on the delivery information 108, whether the package 106 is being delivered to and/or is associated with an intended delivery location. For instance, the analysis engine 110 can receive the delivery information 108 associated with the delivery environment 104 from the user device 102 and determine, based on one or more images that depict the delivery environment 104 and/or an indication of user device 102 location, whether the deliverer has been directed to the delivery location of the package 106. In particular, the analysis engine 110 can identify unique features associated with the one or more images of the delivery environment 104 to determine that the package 106 is being delivered to the correct delivery location. For example, the unique features identified by the analysis engine 110 can include features of a structure within the delivery environment 104 (e.g., garage door markings, doorways, residence siding panels, brick coloring, brick patterns, barriers, fences, windows, landscaping (e.g., plants, trees, etc.), stairs, etc.). Additionally, the analysis engine 110 can determine that the delivery environment 104 includes the correct delivery location of the package 106 based on a comparison of the unique features associated with delivery environment 104 with one or more additional images that have been previously associated with the delivery location and successful deliveries to the customer. The one or more additional images of the delivery location can be captured during previous deliveries to the delivery location, provided by a customer associated with the delivery location, and/or otherwise be obtained and verified for the delivery location. Accordingly, the analysis engine 110 can verify that the deliverer has arrived at the delivery location.

In some embodiments, the analysis engine 110 can determine, based on the delivery information 108, that the package 106 has been placed within the delivery environment 104. In particular, the analysis engine 110 can determine that one or more images of the delivery information 108 include a depiction of the package 106 within the delivery environment 104 and that the package 106 is within a drop-off zone of the delivery environment 104. The drop-off zone can be determined based on one or more previous deliveries to the delivery environment 104, wherein the one or more previous deliveries are associated with an indication that the delivery was successfully completed, or was associated with a customer complaint, and an additional indication of a specific location at which a previously delivered package was left within the delivery environment 104. Accordingly, the drop-off location can be determined from the one or more previous deliveries, and the additional indications of previous package delivery locations, associated with the indication of a successful delivery.

In some embodiments, the one or more images including the package 106 can be captured in response to a prompt displayed on the user device 102, associated with an indication that the package 106 is within the one or more images, and/or identified as containing the package 106 by an internal algorithm of the analysis engine 110. Additionally, the analysis engine 110 can determine, based on the unique features of the delivery location depicted by the delivery information 108, that the package 106 has been placed within a drop-off zone. For instance, the unique features of the delivery location can include structural features of the customer residence, patterns/designs associated with a garage door or a doorway, brick patterns associated with a structure or a sidewalk, landscaping features, fences, barriers, and other features included in the delivery information 108. Additionally, the unique features of the delivery location can be identified based on a plurality of images previously evaluated and associated with the delivery environment 104. Further, the analysis engine 110 can be configured to correlate a set of the unique features from the plurality of images as indicators of the drop-off zone for the package 106 within the delivery environment 104. For example, the drop-off zone for a delivery environment 104 can be a front porch of a customer residence and the set of unique features include a fence surround the front porch (e.g., the unique features related to the fence can include slate spacing, coloration of the fence components, thickness of a handrail, height of the fence, etc.), landscaping features near the front porch, a brick wall of the residence that the front porch extends from, a doorway from the residence to the front porch, and other unique features that enable the identification of the drop-off zone for the delivery environment 104. Accordingly, the analysis engine 110 can determine that the package 106 has been placed in proximity to the set of unique features and that the package 106 has been placed in the drop-off zone.

In some embodiments, the analysis engine 110 can compare the drop-off zone associated with the package 106 with one or more known drop-off locations associated with the delivery location. The one or more drop-off locations can include unsafe drop-off locations (e.g., locations associated with package theft), rejected drop-off locations, and/or approved drop-off locations (e.g., locations where deliveries have been successfully completed). Additionally, the one or more drop-off locations can be associated with previous deliveries of packages to the one or more drop-off locations. For instance, the unsafe drop-off locations can be associated with customer feedback that previous packages identified as delivered to the unsafe drop-off locations were not received, were received with damage, or were taken/stolen by an unauthorized person (possibly indicated by security surveillance images/video). Further, the approved drop-off locations can be associated with positive customer feedback associated with package delivery or no further communication from the customer after previous packages were delivered to the approved drop-off locations. Accordingly, the analysis engine 110 can determine whether the drop-off zone associated with the package 106 within the delivery environment 104 matches or is within one of the one or more drop-off locations (e.g., unsafe drop-off locations, rejected drop-off locations, approved drop-off locations, etc.) associated with the delivery location.

In some embodiments, the analysis engine 110 can generate delivery location instructions 112 for the deliverer. In particular, the analysis engine 110 can determine, based on the determination that the delivery environment 104 is associated with the delivery location and/or that the package 106 has been placed in a drop-off zone at the delivery location, the delivery instructions 112 that are to be completed by the deliverer. Additionally, a user interface of the user device 102 can display the delivery location instructions 112 to the deliverer via an augmented reality overlay, a marked image of the delivery environment 104, an interface capable of providing instructions to the deliverer regarding the delivery location indication 114 and/or the delivery location suggestion 116. In at least one embodiment, the delivery location indication 114 can be configured to provide information to the deliverer regarding the package 106 depicted within the delivery environment 104. The delivery location indication 114 can be generated by the user device 102 and/or the analysis engine 110 based at least on the unsafe drop-off locations, the rejected drop-off locations, and/or the approved drop-off locations associated with the delivery location. In particular, the delivery location indication 114 can be an indication that the current drop-off zone associated with the package 106 is rejected (e.g., the cross projected over the package) and that the package 106 is to be relocated within the delivery environment 104. Similarly, the delivery location indication 114 can be an indication that the drop-off zone associated with the package 106 is approved and that the delivery can be/has been completed. In at least one additional embodiment, the delivery location suggestion 116 can be provided via the user device 102 to assist in the placement of the package 106 at the delivery location. In particular, where the drop-off zone of the package 106 is rejected, unsafe, or otherwise unacceptable, the delivery location instructions 112 can include an indication of one or more approved drop-off locations within the delivery environment 104. Similarly, the analysis engine 110 can include a delivery location suggestion 116 in the delivery location instructions 112 where the one or more images of the delivery environment 104 are determined to not include the package 106. Accordingly, the delivery location suggestion 116 can provide an indication of where the package 106 is to be placed for completion of the delivery at the delivery location.

In some embodiments, the analysis engine 110 can generate delivery location instructions 112 for the deliverer. In particular, the analysis engine 110 can determine, based on the determination that the delivery environment 104 is associated with the delivery location and/or that the package 106 has been placed in a drop-off zone at the delivery location, the delivery instructions 112 that are to be completed by the deliverer. Additionally, the delivery instructions 112 can be audibly output via the user device 102 as audible instructions for delivering the package 106 to a drop-off zone within the delivery environment 104 or relocating the package 106 from a rejected drop-off location to an approved drop off location. For example, the delivery location indication 114 can be audibly presented to the deliverer, via one or more speakers and/or audio outputs associated with the user device 102, as an audio segment configured to inform the deliverer that the package 106 has been placed within a rejected drop-off location. Additionally, the delivery location suggestion 116 can be audibly presented to the deliverer as an additional audio segment configured to identify an approved drop-off location within the delivery environment 104. Further, upon determining that the package 106 has been placed at the approved drop-off location an audible indication can be provided that delivery has been completed at the delivery environment 104. Accordingly, the analysis engine 110 can be configured to generate audible indications for directing the deliverer within and/or to the delivery environment 104, relocating the package 106 placed at a rejected drop-off location based on the delivery location indication 114, placing the package 106 according to the delivery location suggestion 116, and other instructions associated with the delivery environment 104. The audible indication output by the user device 102 may include words, beeps, chimes, buzzing sounds, alarms, ringing sounds, or any other sound that indicates that the deliverer has placed a package in an approved drop-off location and/or a rejected drop-off location associated with the delivery environment 104.

Accordingly, utilizing an analysis engine 110 to identify drop-off locations associated with a delivery environment 104 and provide delivery location instructions 112 can improve customer satisfaction and operational efficiency associated with delivery operations of a service provider (e.g., an entity associated with causing the package 106 to be delivered to the customer from a third-party merchant or from an internal merchant) associated with the analysis engine 110. In particular, providing the delivery location instructions 112 can improve chances of the package 106 (or packages) being delivered within the delivery environment 104 such that the package 106 will be received by the customer associated with the delivery environment 104. Additionally, the delivery location instructions 112 can reduce the chances of the package 106 (or packages) being delivered to the delivery environment 104, but either being damaged before the customer can retrieve the package 106 or the package 106 being stolen or otherwise lost before retrieval by the customer. The delivery location instructions 112 can improve deliverer completion of delivery orders, placed by the customer, with the service provider. Providing the delivery location instructions 112, based on delivery information 108 obtained from the delivery environment 104 during delivery of the package 106, can improve the customer and the deliverer experience in placing the package 106 at an approved drop-off location. Similarly, the delivery location instructions 112 can reduce logistics costs and project management resources consumed by individual delivery orders by reducing the number of delivery orders that require intervention by the service provider to remedy lost packages, damaged delivery goods, and other issues that cause customer dissatisfaction with the service provider. Alternatively, or in addition, the delivery location instructions 112 can reduce financial and logistics resources consumed in reacquiring delivery goods from third-parties in scenarios where a customer did not receive the package 106. Accordingly, the service provider can benefit from increased customer goodwill and reduced operational costs by providing delivery environment specific instructions to deliverers based on the delivery information 108 obtained via the user device 102.

Figure 2:
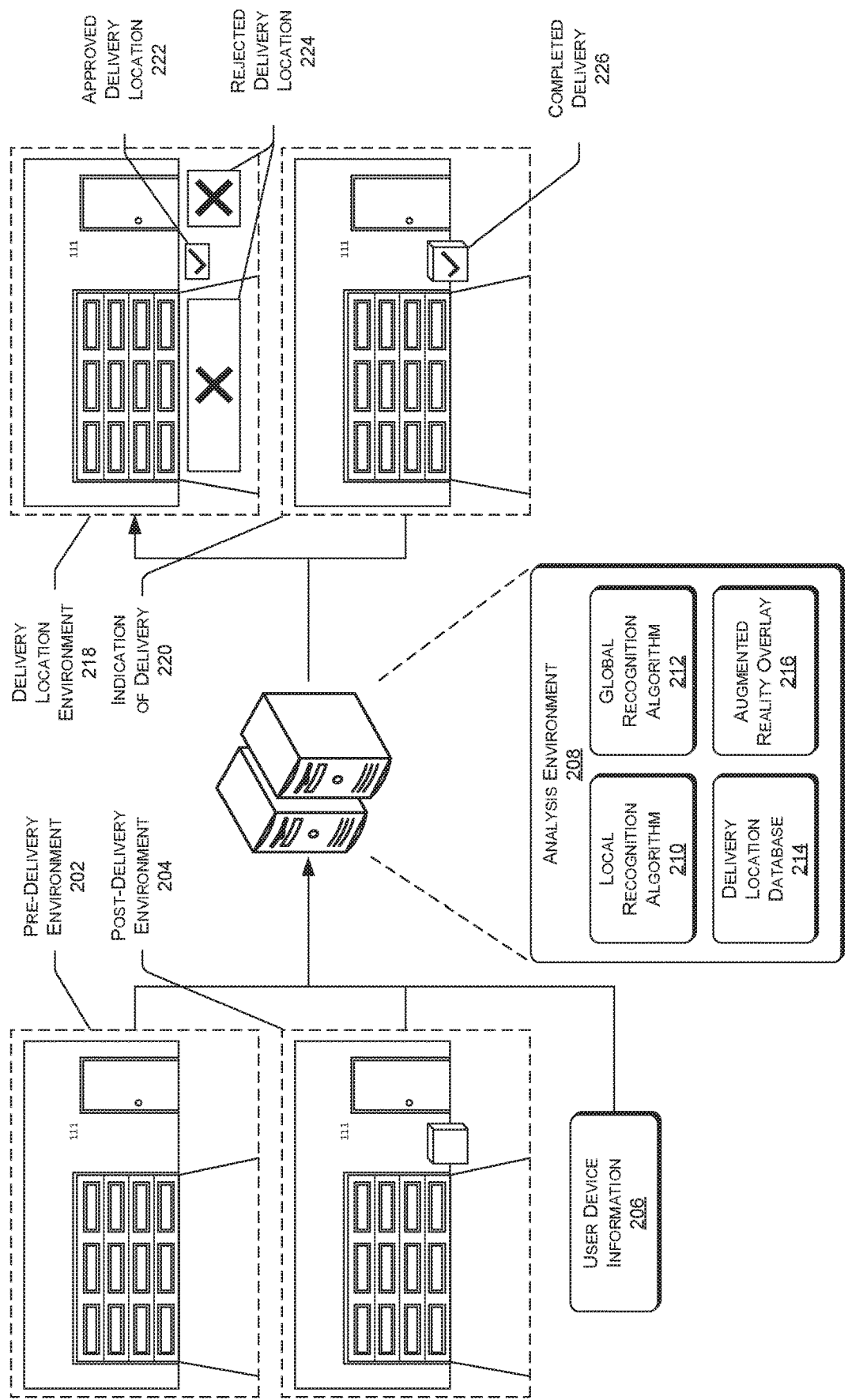
FIG. 2 illustrates an example analysis environment for generating augmented reality overlays that provide guidance to deliverers at a delivery location such that a package is placed within an approved delivery location and/or relocated from a rejected delivery location.

FIG. 2 illustrates an example analysis environment for generating augmented reality overlays that provide guidance to deliverers at a delivery location. As noted above, a user device can be utilized to capture one or more images of a delivery environment. For the purposes of this discussion, the term "image" or "images" may include still images, panoramic images, videos, or any other type of image that visually depicts a delivery location of a customer. The one or more images can include a pre-delivery environment 202 and/or a post-delivery environment 204. Additionally, the user device 102 can collect user device information 206 such as a location of the user device 102, networks available to the user device 102, and other indications that can be utilized identifying the delivery location. The one or more images and/or the user device information 206 can be provided to an analysis environment 208 that includes local recognition algorithm(s) 210, global recognition algorithm(s) 212, a delivery location database 214, and/or an augmented reality overlay 216. Accordingly, the analysis environment 208 can generate a drop-off location overlay 218 and/or an indication of a delivery overlay 220. As noted with respect to FIG. 1, the analysis environment 208 can be provided by a service entity that either provides delivery services for customer goods provided by the service entity or provides logistical services for delivery of goods from a third-party manufacturer to the customer.

In some embodiments, one or more images may be captured by a camera, a sensor, or other imaging component of the user device, wherein the one or more images can include pre-delivery environment(s) 202 and/or post-delivery environments 204. In particular, the pre-delivery environment 202 can depict a delivery environment that the deliverer has arrived at based on navigation instructions before a package has been placed within the delivery environment. Similarly, the post-delivery environment 204 can depict the delivery environment where the package has been placed in a drop-off location identified by the deliverer based on the navigation instructions and manual identification of appropriate drop-off locations. Accordingly, the pre-delivery environment 202 and/or post-delivery environment 204 can be provided to the analysis environment 208 to confirm delivery of the package and verify placement of the package in an approved drop-off location at the intended delivery location.

In some embodiments, the analysis environment 208 can be configured to utilize a local recognition algorithm 210, a global recognition algorithm 212, and a delivery location database 214 to determine whether the delivery location that the deliverer has arrived at is an intended delivery location for the package and whether the package has been placed at an approved drop-off location at the intended delivery location. The local recognition algorithm 210 can be trained on a per-address basis such that the local recognition algorithm 210 is configured to identify unique features associated with an address/an intended delivery location based on a plurality of images that have been previously analyzed, graded, and/or associated with the intended delivery location. In particular, the local recognition algorithm 210 can be trained to recognize unique features that are specific to the intended delivery environment for a package and generate delivery environment dependent determinations (e.g., determining where approved and rejected delivery locations are located within the delivery environment based on the unique features of the delivery environment). Additionally, the global recognition algorithm 212 can be trained to recognize images features (e.g., package dimensions, package coloration, package features, landscaping elements, driveways, sidewalks, mailboxes, location addresses, etc.) that can be common to multiple delivery locations. For instance, the global recognition algorithm 212 can be trained to identify packages within the delivery environment, generate a three-dimensional (3D) model of the delivery environment, identify generic features of the delivery environment (driveways, walk ways, lawns, porches, etc.), and other features that can be identified for multiple delivery locations. Further, the global recognition algorithm 212 can be trained to recognize images features that may exist in a plurality of delivery environments and may not be specific to the intended delivery environment of the package and associated with the local recognition algorithm 210 (e.g., the global recognition algorithm 212 can recognize delivery environment independent features).

It should be noted that, while the local recognition algorithm 210 and the global recognition algorithm 212 are commonly discussed independently of one another, the local recognition algorithm 210 and the global recognition algorithm 212 can be components of a single unified algorithm of the analysis environment 208. In particular, the local recognition algorithm 210 can be a local recognition algorithm model. Similarly, the global recognition algorithm 212 can be a global recognition algorithm model. Additionally, an algorithm utilized by the analysis environment 208 can comprise the global recognition algorithm (model) 212 and the local recognition algorithm (model) 210, wherein the algorithm utilized by the analysis environment 208 is tailored to the delivery location based on the incorporation of the local recognition algorithm 210. Accordingly, while the discussion of global algorithms and local algorithms may be specific to individual algorithms, global algorithms can be utilized as global models by an algorithm and local algorithms can be utilized as local models, specific to the delivery location, by the algorithm.

In some embodiments, and as noted above, the local recognition algorithm 210 can be trained and utilized on a per-address basis. The local recognition algorithm 210 to be utilized for the pre-delivery environment 202 and/or the post-delivery environment 204 can be identified based on user device information 206 that indicates a general geographic location associate with the deliverer, the package, and/or the delivery environment. The geographic location can indicate that the deliverer is within a vicinity of the delivery location and/or an address where the package is to be delivered. Accordingly, the user device can determine that the deliverer has arrived at or near the delivery location and can utilize the local recognition algorithm 210 to further verify the location. In particular, the local recognition algorithm 210 can analyze the pre-delivery environment 202 and/or the post-delivery environment 204 to determine whether the deliverer has arrived at the correct delivery location.

In some additional embodiments, the local recognition algorithm 210 can be trained on the per-address basis from one or more images that have been associated with the delivery location. In particular, the local recognition algorithm 210 can be trained based on one or more images of package deliveries that have been successfully completed at the delivery location. The one or more images of the package deliveries may be taken by previous deliverers, of the delivery location, upon arrival or after delivery of the package. Further, the one or more images can be evaluated to ensure that the one or more images are captured at the delivery location. For example, a previous package can be delivered to a delivery location for a customer, an image be captured of the package at the delivery location, and a notification provided to the customer based on the delivery being complete. Where the customer provides a positive response or review to the notification, the image can be evaluated as an accurate image of the delivery location. Similarly, where the customer does not provide a response to the notification, the image can be evaluated as an accurate image of the delivery location. However, where the customer provides a negative response or review of the delivery, the image can be evaluated as an inaccurate image of the delivery location. Additionally, the negative response and/or review can be further evaluated to determine whether the delivery location of the package was an incorrect delivery location (e.g., package was placed at the wrong address or wrong delivery location) or an unsafe delivery location (e.g., the package was placed at the correct delivery location, but was stolen or taken before the customer could retrieve the package). Similarly, the images evaluated as accurate images of the delivery location can be associated with safe (or safer) delivery locations. The one or more images (accurate and/or inaccurate) can be stored in association with the delivery location, after evaluation, in the delivery location database 214 for further consideration and/or matching operations executed by the local recognition algorithm 210.

In some additional, or alternative, embodiments, the local recognition algorithm 210 can be trained based on one or more images provided by the customer associated with the delivery location. In particular, the customer can provide one or more images that include preferred delivery locations, approved delivery locations, unsafe delivery locations, do not deliver locations, and other locations within the delivery environment. Additionally, the customer can provide indications and/or tags for the one or more images identifying whether packages can be delivered to the location(s) depicted by the one or more images. Accordingly, the one or more images provided by the customer can be evaluated, associated with indications of approved and restricted delivery locations within the delivery environment, and stored in the delivery location database 214 for utilization by the local recognition algorithm 210. Further, the local recognition algorithm 210 can be trained based on the one or more images to determine whether the pre-delivery environment 202 and/or the post-delivery environment 204 captured by the user device are associated with the delivery environment where the package is to be delivered.

In some embodiments, the global recognition algorithm 212 can be trained based on one or more images stored by the delivery location database 214. In particular, the one or more images utilized to train the global recognition algorithm 212 can be associated with one or more delivery environments. Additionally, the global recognition algorithm 212 can be trained to identify packages, areas and/or zones of the delivery environment, generic features of the delivery environment, and other indicators that may be utilized in generating the augmented realize overlay 216.

Further, the global recognition algorithm 212 can be trained to locate the package and/or the indicators within a 3D environment of the delivery environment. As noted above, a customer can provide indications of approved and unapproved delivery locations within the delivery environment. From the indications provided by the customer, the global recognition algorithm 212 can be configured to determine whether the post-delivery environment 204 includes the package placed at an approved delivery location or if the package is to be relocated to another delivery location, if the package is placed at an unapproved delivery location.

In some embodiments, the analysis environment 208 can be configured to receive the pre-delivery environment 202 and/or the post-delivery environment 204 and generate, based on at least one of the local recognition algorithm 210 and the global recognition algorithm 212, the delivery location environment 218 and/or the indication of delivery 220. In particular, the delivery location environment 218 can be configured to display approved delivery locations 222 and unapproved/rejected delivery locations 224 within the delivery environment. It should be noted that while the delivery location environment 218 does not include the package, the delivery location environment 218 can be generated from the pre-delivery environment 202 and/or the post-delivery environment 204 based on the one or more images provided by the deliverer and/or the user device associated with the deliverer. Additionally, the approved delivery location 222 and the rejected delivery location 224 can be determined based on customer provided indications, status of past deliveries to the delivery environment, outcomes of past deliveries to the delivery environment, regions of interest associated with the delivery environment and/or other delivery environments, and other indicators that can identify delivery locations as desirable and/or undesirable. Further, the delivery location environment 218 can be generated by the augmented reality overlay 216 for display via the user device and/or a user interface associated with the deliverer.

In some additional embodiments, the delivery location environment 218 can include the pre-delivery environment 202 and/or the post-delivery environment 204 augmented with additional information and/or indications related to the delivery environment associated with the customer. In particular, the delivery location environment 218 can include one or more approved delivery environments 222, one or more rejected delivery environments 224, one or more representations of a package, and other information to be presented to the deliverer. The approved delivery location(s) 222 can include delivery locations within the delivery environment where packages have been delivered to the customer without complaint, issue, or other negative feedback related to the delivery and/or with positive feedback. Similarly, the rejected delivery location(s) 224 can include delivery locations within the delivery environment where packages have been delivered to the customer with complaint, issue, loss of package, delivered not received indications, and other delivery problems. Additionally, the rejected delivery location(s) 224 can include delivery locations within the delivery environment that are associated with a risk of package damage and/or other hazards (e.g., in a driveway, in front of a doorway, etc.).

In some further embodiments, the delivery location environment 218 can be generated by the analysis environment 208 based at least on the local recognition algorithm 210 and/or the global recognition algorithm 212. In particular, the local recognition algorithm 210 can be configured to identify that the pre-delivery environment 202 and/or the post-delivery environment 204 comprise the intended destination for the package. Additionally, the local recognition algorithm 210, trained from one or more images associated with the intended delivery environment, can be configured to identify approved delivery locations 222 and rejected delivery locations 224 within the pre-delivery environment 202 and/or the post-delivery environment 204 based at least on one or more images associated with the delivery environment stored by the delivery location database 214. Similarly, the global recognition algorithm 212 can be configured to identify whether the pre-delivery environment 202 and/or the post-delivery environment 204 include features such as the package, high-risk package placement areas (e.g., driveways, walkways, unsecured portions of the delivery environment, etc.), and other features that may be shared between delivery environments. Further, the global recognition algorithm 212 can be configured to identify approved delivery locations 222 and rejected delivery locations 224 within the pre-delivery environment 202 and/or the post-delivery environment 204 based at least on one or more images of delivery environment features associated with the intended delivery environment and/or one or more additional delivery environments.

In some embodiments, the augmented reality overlay 216 can be generated by the analysis environment 208 based on indications of approved delivery locations 222 and/or rejected delivery locations 224 generated by the local recognition algorithm 210 and/or global recognition algorithm 212. As displayed by FIG. 2, the approved delivery locations 222 can be indicated by being highlighted, encircled, and/or otherwise associated with focus indicators that are associated with positive feedback indicators (e.g., green colors, checkmarks, "approved" or "correct" tags, audible commands, audible indicators, etc.). Similarly, the rejection delivery locations 224 can be indicated by being highlighted, encircled, and/or otherwise associated with focus indicators that are associated with negative feedback indicators (e.g., red colors, crossed out indicators, "rejected" or "unsafe" tags, audible commands, audible indicators, etc.). Additionally, the approved delivery locations 222 and/or rejected delivery locations 224 can be overlaid onto an image of the intended delivery environment or onto a video feed associated with the intended delivery environment. Further, the augmented reality overlay 216 can generate and update the approved delivery locations 222 and/or rejected delivery locations 224 onto the image and/or the video feed in real-time (i.e., updated in a substantially instantaneous and/or constant manner) such that as the point of view of the user device changes, the approved delivery locations 222 and/or rejected delivery locations 224 alter to reflect the modified point of view.

In some embodiments, the indication of delivery 220 can be generated by the analysis environment 208 to provide further instructions regarding the delivery of the package. In particular, the indication of delivery 220 can include an indication that the package has been placed within an approved delivery location 222 or is not placed within a rejected delivery location 224, wherein the indication is a completed delivery indication 226. Additionally, the indication of delivery 220 can include instructions to relocate the package due to the package being placed within a rejected delivery location 224 and/or not being placed within an approved delivery location 222. Further, the indication of delivery 220 can indicate that the delivery environment depicted by the pre-delivery environment 202 and/or the post-delivery environment 204 is not the intended delivery environment for the package and provide instructions to cause the deliverer to relocate to the intended delivery environment.

In some embodiments, the analysis environment 208 can be configured to determine whether a deliverer has mistakenly navigated to an incorrect delivery environment. In particular, the analysis environment 208 can receive the pre-delivery environment 202, the post-delivery environment 204, and/or the user device information 206 and determine whether the deliverer has misplaced the package within the delivery environment. For example, the misplacement of the package may be due to the placement of the package within a portion of the delivery environment (e.g., a driveway, a lawn, in a patch of trees, etc.) that has been explicitly rejected as a potential delivery location and/or has been associated with customer dissatisfaction. Additionally, the portions of the delivery environment can be classified as egregious placement errors within the pre-delivery environment 202 and/or the post-delivery environment 204. Further, the egregious placement errors or egregious placement locations can be determined by the local recognition algorithm 210 or the global recognition algorithm 212. As noted above, the local recognition algorithm 210 can be configured to recognize portions of the delivery location environment 218 that have been previously determined, on a per-address basis, to upset or otherwise cause the customer to be dissatisfied with delivery of packages and provide an indication of the rejected delivery location 224 based on that association. Alternatively, or in addition, the global recognition algorithm 212 can be configured to recognize portions of the delivery environment 218 that have been previously determined to be generally unacceptable delivery locations based on one or more delivery environments. Accordingly, the analysis environment 208 can be configured to identify rejected delivery locations 224 based on previous interactions between the customer associated with the delivery location environment 218 and/or additional customers associated with additional delivery environments.

Figure 3:
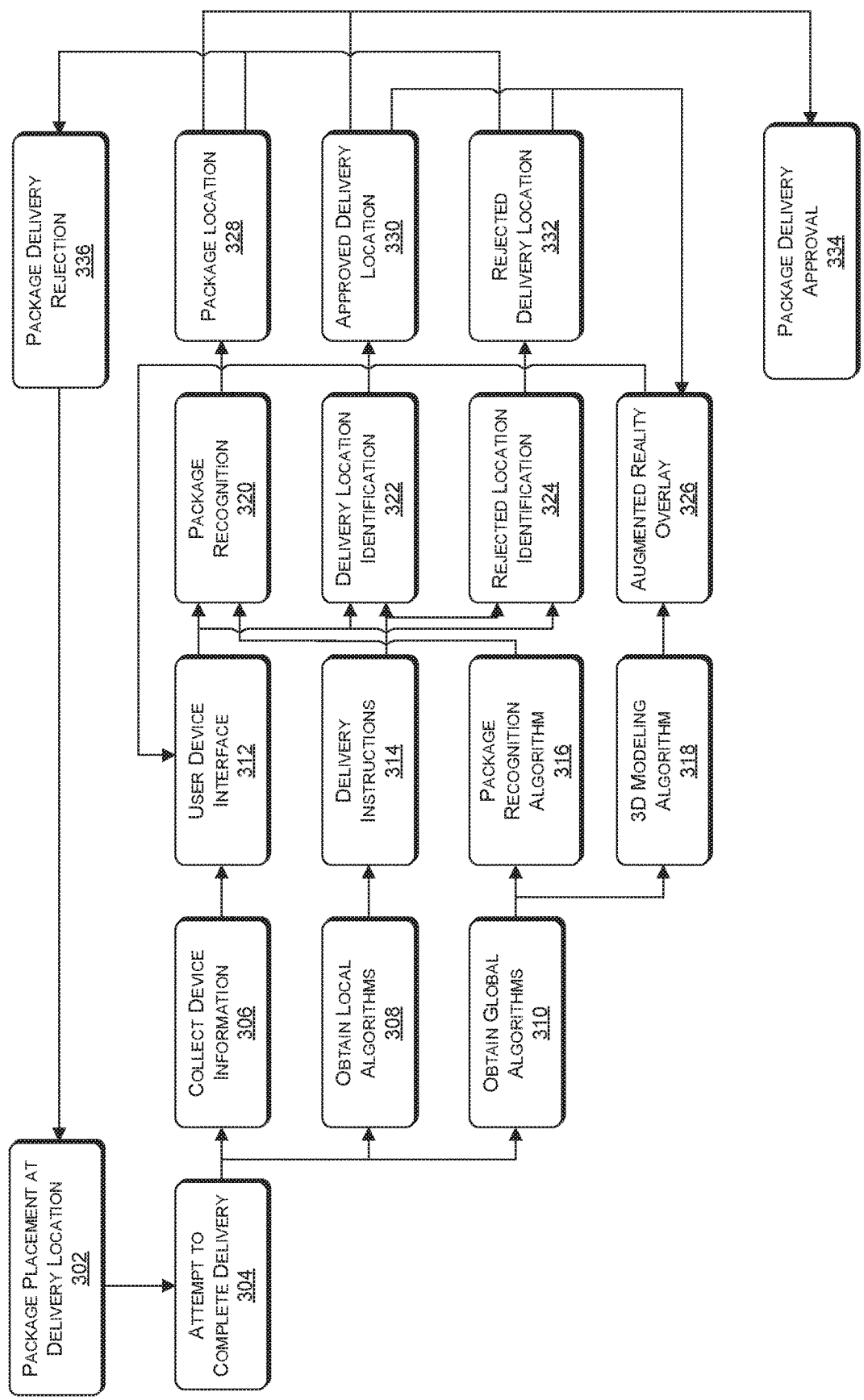
FIG. 3 illustrates a flow chart for completing delivery of a package to an intended delivery environment and verifying package placement within the intended delivery environment.

FIG. 3 illustrates a flow chart for completing delivery of a package to an intended delivery environment and verifying package placement within the intended delivery environment.

At block 302, a deliverer can be directed to a delivery environment by navigation software and/or GPS directions. Upon arrival at the delivery environment, the deliverer can attempt to deposit the package within the delivery environment for the customer. In particular, the deliverer can manually attempt to locate and place the package for delivery. Alternatively, or in addition, the deliverer can activate package placement and/or package verification software to identify the delivery environment as an intended delivery environment and confirm placement of the package within the intended delivery environment. Additionally, at block 304, the deliverer can indicate that the package has been placed or is to be placed within the delivery environment. In at least one embodiment, the package placement verification can be initiated by the deliverer attempting to complete the delivery of the package within the delivery environment. Accordingly, the deliverer can trigger the package placement verification system to collect device information at block 306, obtain local algorithms relevant to the delivery environment 308, and obtain global algorithms configured to assist in the placement of the package within the delivery environment.

At block 306, a user device associated with the deliverer can collect device information associated with a location of the deliverer. The location of the deliverer and/or the user device can be utilized to confirm that the deliverer has arrived in an area around the intended delivery environment and identify nearby addresses/delivery locations besides the intended delivery environment. Additionally, or alternatively, the user device can activate a camera, a sensor, or other recording device configured to capture visual and/or other data related to the delivery environment. For example, the user device can cause the deliverer to capture one or more images of the delivery environment before and/or after the package has been placed for delivery. Alternatively, or in addition, the user device can capture a video or a video feed (e.g., a continuous recording of video data from the user device that is displayed via a user interface to the deliverer). Generally, the user device can be utilized to capture information regarding the delivery environment and/or the package within the delivery environment.

At block 308, the user device associated with the deliverer can obtain a local algorithm(s) associated with the intended delivery environment. In particular, and as noted above, a local algorithm can be trained based on delivery environment information obtained by previous deliverers within the delivery environment, provided by customers associated with the delivery environment, and/or otherwise obtained from the delivery environment. Additionally, the local algorithm for the delivery environment can be maintained by a central server that receives training data for the local algorithm and updates local algorithms for utilization in package placement verification. In at least one embodiment, the local algorithm can be configured to operate on a per-address basis (e.g., the local algorithm is trained based on delivery environment data from a single delivery address). In at least one additional embodiment, the local algorithm can be configured to recognize multiple delivery locations within a delivery environment (e.g., multiple residents associated with a structure, numerous residences within a short distance, etc.). Accordingly, the user device can obtain/receive a local algorithm for the delivery environment.

In some embodiments of block 308, the user device can obtain the local algorithm for a delivery environment at the beginning of a delivery route for the deliverer. In particular, the local algorithm and one or more additional local algorithms can be received by the user device with a batch of packages to be delivered by the deliverer. Additionally, the local algorithm and the one or more additional local algorithms can be configured to function local to the user device during package placement verification. For example, the local algorithm and the one or more additional local algorithms can be stored within the memory of the user device and activated when the user device determines that the deliverer has arrived at the address associated with the local algorithm. In some additional embodiments of block 308, the user device can communicate, via a communication network, with a server that the deliverer has arrived at the delivery environment. Additionally, the server can be configured to determine the local algorithm associated with the delivery environment, receive information (e.g., images, video, audio, etc.) from the user device, and utilize the local algorithm to analyze the information from the user device. Accordingly, while the below examples will be primarily directed to the user device, a remote server can be utilized to execute operations of the local algorithm.

At block 310, the user device associated with the deliverer can obtain global algorithms for utilization during package placement verification. In particular, the global algorithms can be trained based on delivery environment information obtained by previous deliverers, provided by customers, and/or otherwise obtained from the delivery environment and/or one or more additional delivery environments. Similar to the local algorithms, the global algorithms can be trained and maintained by a server configured to receive delivery environment information, evaluate the delivery environment information, and incorporate the delivery environment information into the training of the global algorithms. Additionally, the global algorithms can be loaded onto the user device before a series of package deliveries and/or executed by the server for the user device(s). It should be noted that the server can be provided by a service provider that organizes and manages the delivery of customer goods to the customer based at least on delivery order placed with the service provide. Alternatively, or in addition, third-party entities may utilize the service provider to complete deliveries to customers to fulfill customer orders. Independent of the source of the customer order for delivery, the service provider can track and utilize the delivery of customer goods to train and maintain the local algorithms and global algorithms utilized to provide delivery instructions for the delivery environment.

At block 312, a user device interface can be generated based at least on the device information collected at block 306. In particular, the user device interface can include notifications for the deliverer, information regarding the delivery environment, and other indications of delivery information associated with the delivery environment. Additionally, the user device interface can include navigation information for reaching the delivery environment, instructions for capturing device information, indications of a determined package location within an image or video captured within the delivery environment, notifications that the deliverer may not be at the correct address, and interactable interfaces for feedback regarding the package placement verification process. Further, the device user interface can present delivery environment information including customer information, address information, and contact information associated with the package being delivered.

At block 314, the local algorithms, independently or in combination with other aspects of the package placement verification process, can generate delivery instructions associated with the delivery environment. In particular, the local algorithm(s) can be configured to determine whether the delivery environment is the intended delivery environment, determine whether deliverer relocation instructions are to be provided, and other operations within the delivery environment.

In at least one embodiment of block 314, the local algorithm(s) can be configured to compare the device information collected from the user device with delivery environment information stored in a delivery environment database (e.g., delivery location database 214). In particular, the local algorithm can be configured to analyze the device information collected by the user device, identify unique features within the delivery environment, and determine whether the device information matches environment information for the intended delivery environment. For example, the local algorithm can receive and analyze the device information to identify unique features based on local features and global features within the device information. Local features can relate to the package and/or the structure within the device information. The local features can include doors, building siding, architectural features, windows, and other features within the collected device information. It should be noted that the local features can vary widely between local algorithms and delivery environments, the local features utilized to identify the delivery environment(s) are identified by the local algorithm during training of the local algorithm. Accordingly, a first local algorithm can utilize a first set of local features to determine whether a delivery environment in the device information is an intended delivery environment, a second local algorithm can utilize a second set of local features that can be partially or wholly different from the first set of local features. In contrast, global features can be abstract in comparison to local features. For instance, global features can include lighting patterns, environmental features, alignment of various features within the device information, and other related features. Similar to local features, a first global algorithm can utilize a first set of local features to determine whether a delivery environment in the device information is an intended delivery environment, a second global algorithm can utilize a second set of local features that can be partially or wholly different from the first set of local features.

In at least one additional embodiment of block 314, the local algorithm(s) can compare the local features and the global features determined from the device information with known local features and known global features associated with the intended delivery environment within a delivery environment database. In particular, the local algorithm can generate a score for the local features and the global features identified in the device information when comparing the device information to the delivery environment information stored in the delivery environment database for the intended delivery environment. Additionally, the local algorithm can determine the score by determining a number of unique features (e.g., local features and global features) are shared between the delivery environment and the intended delivery environment, determining a similarity between the unique features shared by the delivery environment and the intended delivery environment, and other evaluations of the unique features of the delivery environment against the unique features of the intended delivery environment. It should be noted that the local algorithm can be trained against a dataset of delivery environment information collected from the intended delivery environment by previous deliverers, the customers associated with and/or previously associated with the intended delivery environment, and from digitally modified/simulated delivery environment information generated from the delivery environment information. By receiving and/or generating iterations of different perspectives, lighting environment, seasonal impacts, and other aspects of the intended delivery environment, the local algorithm(s) can be trained to effectively identify whether unique features within the device information associated with the delivery environment match unique features associated with the intended delivery environment.

It should be noted that, sets of unique features can be identified from a plurality of data points (e.g., images) associated with the intended delivery environment to identify data point clusters (e.g., a set of images of the intended delivery environment). Additionally, the data point clusters can be utilized by the local algorithm to efficiently match the delivery environment with the intended delivery environment. The set of unique features can be utilized with additional sets of unique features as priority identifiers that reduce the number of data points associated with the intended delivery environment that are to be compared with the device information collected from the delivery environment. Accordingly, the set of unique features can form a cluster of data points that are shared unique features utilized as high priority identifiers to streamline the comparison of the device information with the delivery environment information of the intended delivery environment.

In at least one further embodiment of block 314, the local algorithm(s) can determine whether the collected device information is associated with a neighboring delivery environment. In particular, the local algorithm can be trained to recognize unique features within the device information that are associated with neighboring delivery environments and/or outskirts of the intended delivery environment. Additionally, or alternatively, one or more additional algorithms associated with one or more neighboring delivery environments can be further utilized to determine whether the unique features identified from the delivery environment match the neighboring delivery environment rather than the intended delivery environment. As noted above, with respect to FIG. 2, the local algorithm and the one or more additional algorithms associated with the one or more neighboring delivery environments can be models that are utilized by a single algorithm implemented for analysis of the delivery environment. Accordingly, the local algorithm and the one or more additional local algorithms can provide an indication that the delivery environment associated with the device information, and the deliverer by extension, is not the intended delivery environment. Further, the local algorithm and/or the one or more additional algorithms can provide instructions for navigating the deliverer to the intended delivery location.

At block 316, a global algorithm can be utilized to identify a package within the device information. Similar to the local algorithm(s) above, the global algorithm can be trained based on a plurality of images comprising a package placed at a plurality of delivery environments. Due to the global algorithm being non-specific to an address, the global algorithm can be configured to identify a package (or packages) within any delivery environment. Additionally, the delivery environment database utilized to train the global algorithm can comprise deliverer generated images of packages within delivery environments, customer generated images of packages within delivery environments, and computer generated/modified images of packages within delivery environments. As noted above, with respect to FIG. 2, the global algorithm can be a global algorithm model that is utilized by an algorithm, implemented for analysis of the delivery environment, that also includes a local algorithm model and/or one or more additional algorithms associated with neighboring delivery environments. Accordingly, the global algorithm can be utilized to identify and locate package(s) within the collected device information associated with the delivery environment.

At block 318, a global algorithm can be utilized to determine a three-dimensional (3D) layout of the delivery environment. Where the global algorithm of block 316 and the local algorithm of block 314 identify features within the collected device information, the global algorithm of block 318 can be configured to determine a spatial orientation of objects and features relative to other objects and features from the collected device information. The global algorithm can be configured to utilize a single picture or multiple pictures to determine a 3D layout and/or a 3D model of the delivery environment. While the global algorithm can be trained to generate 3D models of the delivery environment in a manner similar to that discussed above for the previous global algorithm and the local algorithm, the global algorithm can also be configured to continuously construct a 3D model for the intended delivery environment from the device information and the previous delivery environment location information. Accordingly, the 3D model for the delivery environment can be constructed from the device information and/or from the previous delivery environment location information captured by previous deliverers.

At block 320, the user device interface and the package recognition algorithm can be configured to recognize the package within the device information and present an indication, via the user device interface, identifying the package to the deliverer. The deliverer can be prompted to provide an indication that the package has been correctly identified. Additionally, the user device interface can be configured to highlight package(s) that have been identified within the device information. Further, while discussed in more detail at block 326, the user device interface can include an augmented reality overlay generated by the 3D modeling algorithm. The package recognition algorithm can interact with the user device interface and the augmented reality overlay to locate the package within the 3D model.

At block 322, the local algorithm can be configured to identify approved delivery locations within the delivery environment. In particular, the local algorithm can be trained to identify approved delivery locations within the delivery environment based at least on previous deliveries to the delivery environment, customer feedback regarding previous deliveries to the delivery environment, customer provided information associated with the delivery environment, and other indications of approved locations for delivery within the delivery environment. For instance, locations that have been repeatedly delivered to in the past without customer complaint can be identified as approved delivery locations for the delivery environment. Similarly, a customer can provide an indication of a preferred delivery location that can be prioritized over other approved delivery locations for the delivery environment. Additionally, positive customer feedback of a package and/or delivery of the package can indicate that the delivery location is an approved delivery location for the delivery environment. Further, delivery locations that are sheltered from weather, hidden from individuals passing the delivery environment, and other potential risks to the package can be identified as approved and/or preferred delivery locations. It should be noted that different types of packages can be associated with different approved delivery locations within the delivery environment. For example, a high value package can be associated with more secure/protected delivery locations and be restricted from exposed delivery locations. Similarly, heavy and/or durable packages that are difficult to handle can be associated with different delivery locations due to the limited threat of theft, damage, and other risk factors for the package.

At block 324, the local algorithm can be configured to identify rejected delivery locations within the delivery environment. Similar to above, the local algorithm can be trained to identify rejected delivery locations within the delivery environment based at least on previous deliveries to the delivery environment, customer feedback regarding previous deliveries to the delivery environment, customer provided information associated with the delivery environment, and other indications of rejected locations for delivery within the delivery environment. For instance, locations that are associated with previous delivered not received notifications, customer complaints regarding damaged packages, and/or other indications of package risks can be identified as rejected delivery locations within the delivery environment. Additionally, the local algorithm can be configured to identify and reject delivery locations within the delivery environment that are associated with customer dissatisfaction such as driveways, positions that block doorways, landscaping features, and other portions of the delivery environment that should not be utilized as delivery locations.

At block 326, the global algorithm can be configured to generate an augmented reality overlay for the delivery environment depicted by the device information and the user device interface. In particular, the augmented reality overlay can be configured to display the approved delivery location(s) identified at block 322 and the rejected delivery location(s) identified at block 324 via the user device interface. Additionally, the augmented reality overlay can be configured to provide highlighted regions of the 3D model to indicate approved delivery locations and rejected delivery locations, outlines where packages should be placed, ghost (e.g., translucent or transparent package representations) packages at approved delivery locations, and other indications of approved delivery locations and rejected delivery locations. It should be noted that augmented reality overlays can be configured as real-time interfaces that are overlaid onto a video feed captured by and displayed on a user device associated with the deliverer. Additionally, as the user device perspective changes, the augmented reality interface can be configured to update and adjust the various indications of approved delivery locations and rejected delivery locations. Accordingly, the augmented reality interface can be configured as a substantially real-time display of approved delivery locations and/or rejected delivery locations. Further, the augmented reality interface can be configured to indicate identified package locations, directions from neighboring delivery environments to the intended delivery environment, modifications in user device perspective that are needed to locate approved delivery locations and/or the package, and other indications that may prove to be useful for the deliverer within the delivery environment.

At block 328, the package can be located with the 3D model and/or the augmented reality overlay and displayed to the deliverer via the user device. As noted above, where the global algorithm identifies a package within the device information collected within the delivery environment, the user device can be configured to display a highlight and/or an indication of the package within the delivery environment. The deliverer can be prompted for feedback regarding the location of the package within the delivery environment, manually identify the package where the global algorithm has failed to identify the package, and/or otherwise provide input regarding the package location within the delivery environment.

At block 330, the approved delivery location(s) can be located with the 3D model and/or the augmented reality overlay and displayed to the deliverer via the user device. In particular, the local algorithm can identify the approved delivery locations within the delivery environment for the package and cause the user device, the user device interface, and/or the augmented reality overlay to display the approved delivery locations that are visible from the current perspective of the deliverer. Additionally, the local algorithm and/or the global algorithm can be configured to locate the approved delivery locations within the 3D model of the delivery environment. Further, the user device can be configured to generate, based at least on the 3D model of the delivery environment and/or the augmented reality overlay, an indication of a location in the delivery environment where the deliverer can access the approved delivery location. Alternatively, or in addition, the user device can be configured to indicate a direction to and/or an obscured location associated with an approved delivery location. Accordingly, the user device can be configured to display, via the user device interface and/or the augmented reality overlay, an approved delivery location where the package is to be placed.

At block 332, the rejected delivery location(s) can be located with the 3D model and/or the augmented reality overlay and displayed to the deliverer via the user device. In particular, the local algorithm can identify the rejected delivery locations within the delivery environment for the package and cause the user device, the user device interface, and/or the augmented reality overlay to display the rejected delivery locations that are visible from the current perspective of the deliverer. Additionally, the local algorithm and/or the global algorithm can be configured to locate the rejected delivery locations within the 3D model of the delivery environment.

At block 334, the package delivery can be approved based on the package location being determined to fall within an approved delivery location. In particular, the user device can determine whether the package location within the delivery environment is within an approved delivery location. Additionally, the user device can provide an indication that the delivery was completed at the delivery environment.

At block 336, the package delivery can be rejected based on the package location being determined to fall within a rejected delivery location. In particular, the user device can determine whether the package location within the delivery environment is within a rejected delivery location. Additionally, the user device can provide an indication that the delivery cannot be completed while the package remains within the rejected delivery location. Further, the user device can cause, via an indication and/or instructions, the deliverer to relocate the package to a new position (e.g., to an approved delivery location). Accordingly, the package can be relocated from a rejected delivery location to an approved delivery location such that the delivery is completed. Alternatively, the package can be repositioned and the package position be reevaluated at block 302.

Figure 4:
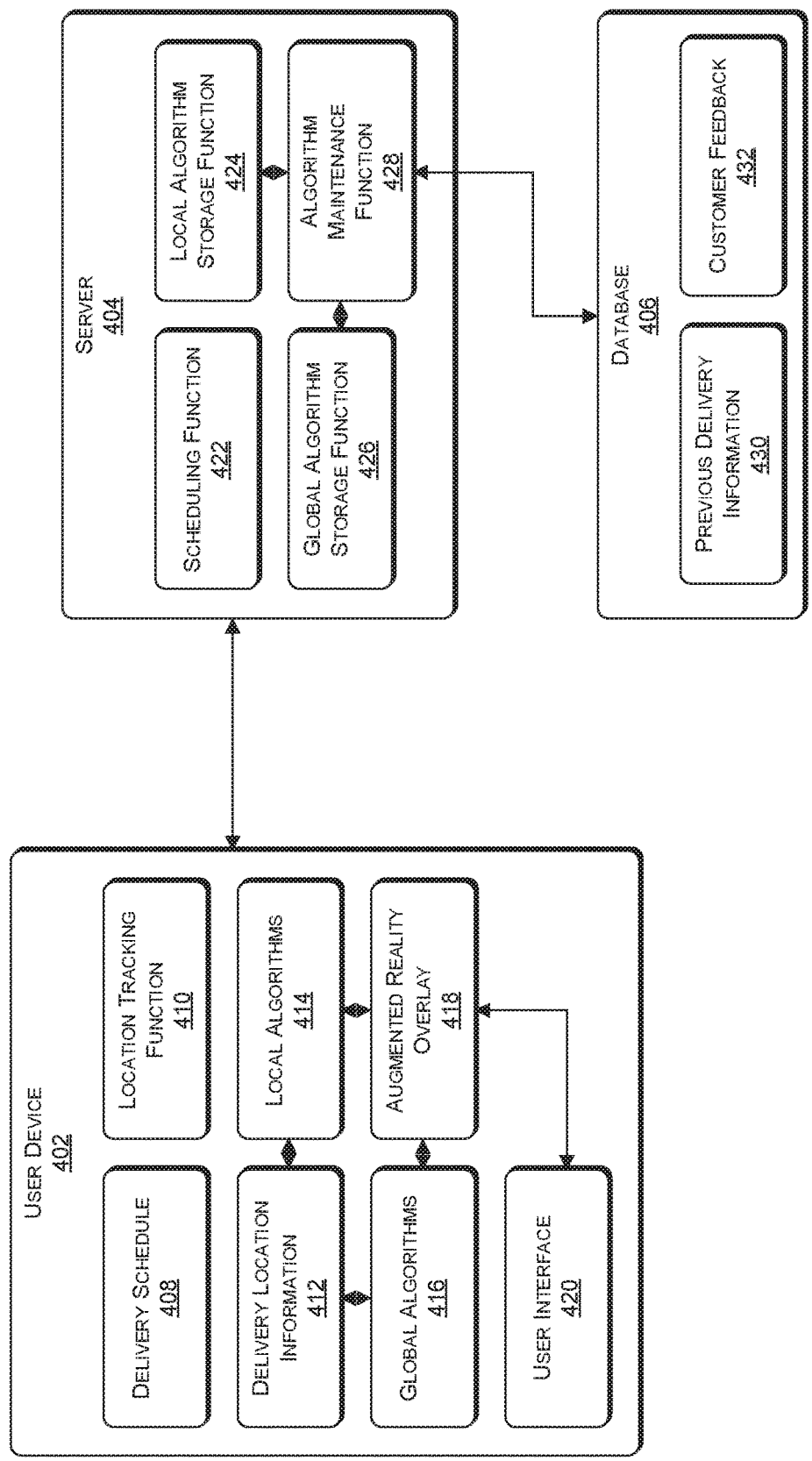
FIG. 4 illustrates an example computing environment representing a package placement verification system for confirming delivery of a package to a customer.

FIG. 4 illustrates an example computing environment representing a package placement verification system for confirming delivery of a package to a customer. In particular, the computing environment can include a user device 402, a server 404, and a database 406. Additionally, the user device 402 can include a delivery schedule 408, a location tracking function 410, a delivery location information module 412, a local algorithm(s) 414, a global algorithm(s) 416, an augmented reality overlay 418, and a user interface 420. Similarly, the server 404 can include a scheduling function 422, a local algorithm storage function 424, a global algorithm storage function 426, and an algorithm maintenance function 428. Further, the database 406 can include previous delivery information 430 and customer feedback 432. It should be noted that the modules, functions, and operations of the user device 402, the server 404, and the database 406 can be configured to provide the operations and techniques described above with respect to FIGS. 1-3.

In some embodiments, a user device 402 can be configured to provide deliverer location verification and package placement verification functionality. In particular, a deliverer can receive one or more packages to be delivered, according to a delivery schedule 408, to one or more intended delivery environments. Additionally, the user device 402 associated with the deliverer can receive one or more local algorithms 414 associated with the one or more intended delivery environments, wherein the local algorithms 414 are individually trained based on delivery environment information associated with a single delivery environment. In at least one embodiment, the local algorithms 414 can include local algorithms trained based on one or more neighboring delivery environments associated with the one or more intended delivery environments. Similarly, the user device 402 can receive one or more global algorithms 416, wherein the one or more global algorithms 416 can be trained based on delivery environment data associated with the one or more intended delivery environments and/or one or more additional delivery environments.

In some embodiments, a delivery schedule 408 can be a sequence of deliveries that are to be completed by the deliverer. It should be noted that the delivery schedule 408 can be a delivery itinerary that provides details regarding the deliveries that are to be completed by the deliverer. The delivery schedule 408 can be specific to the deliverer and/or the user device 402 and can describe one or more packages that are to be delivered to one or more delivery environments. Additionally, the delivery schedule 408 can include delivery timing information, delivery location protocol to be completed by the deliverer (e.g., leave package at approved delivery location, knock on door after delivery, ring doorbell after delivery, obtain customer signature for delivery, leave note and/or delivery receipt, etc.).

In some additional embodiments, and as noted above, user device 402 can be configured to provide redirection of the deliverer from one or more neighboring delivery environments to an intended delivery environment. In particular, the delivery schedule 408 can include the intended delivery environment for a package. Additionally, the intended delivery environment can be associated with one or more neighbor delivery environments that share a border with the intended delivery environment and/or are within a threshold distance of the intended delivery environment. Accordingly, the user device 402 can receive a local algorithm 414 associated with the intended delivery environment and one or more additional local algorithms associated with the one or more neighbor delivery environments for the intended delivery environment. Further, the one or more additional local algorithms can be utilized by the user device 402 to determine whether the deliverer has arrived at the intended delivery location based on the delivery location information 412. In particular, the user device 402 can utilize the local algorithm 414 and the one or more additional local algorithms to determine whether the deliverer has arrived at the intended delivery location or at the one or more neighbor delivery locations. Additionally, the user device 402 can provide navigation instructions to the deliverer that cause the deliverer to leave the one or more neighbor delivery environments and arrive at the intended delivery environment based at least in part on the local algorithm 414 and the one or more additional local algorithms.

In some embodiments, a location tracking function 410 of the user device 402 can be utilized during deliverer navigation and activation of the local algorithms 414 for the intended delivery location. As noted above, the location tracking function 410 can utilize GPS, WiFi fingerprinting, cellular network functions, and other means of determining the location of the user device 402 relative to an intended delivery location. Accordingly, the user device 402 can determine that the driver has arrived at the intended delivery location based on the location tracking function 410 and activate the local algorithm 414 for the intended delivery environment based on the user device 402 being near and/or within the intended delivery environment.

In some embodiments, delivery location information 412 can be collected by the user device 402 at the intended delivery environment. In particular, the user device 402 can be configured to capture images, video, audio, location, and other data associated with the intended delivery environment upon activation of the package placement verification process. In at least one embodiment, the collection of delivery location information 412 can be automatically initiated upon the deliverer arriving at the intended delivery location. In at least one additional embodiment, the collection of delivery location information 412 can be manually initiated by the deliverer for placement of the package at the intended delivery environment and/or after the package has been placed within a delivery environment. Accordingly, the delivery location information 412 can be provided to the local algorithms 414 and the global algorithms 416 as described above with respect to FIGS. 1-3. Additionally, the local algorithms 414 and the global algorithms 416 can be configured to display drop-off instructions (e.g., indications of approved delivery locations, rejected delivery locations, identified packages within the delivery location information 412, etc.) onto a video feed or other user interface 420 via an augmented reality overlay 418. Further, the user interface 420 can provide fields for deliverer feedback, deliverer input to the local algorithms 414 and the global algorithms 416, deliverer overrides, deliverer confirmation of drop-off location/package identification, and other deliverer workflows associated with package placement verification.

In some further embodiments, the user device 402 can be configured to forego the utilization of the augmented reality overlay 418. In particular, the user device 402 can lack the computational capacity to generate the augmented reality overlay 418 or can otherwise determine that the augmented reality overlay 418 is not to be utilized by the user device 402. Accordingly, the user device 402 can utilize the local algorithms 414 and the global algorithms 416 to generate, via the user interface 420, a planar bounding box. Additionally, the planar bounding box can be an indication, displayed via the user interface 420, configured to identify whether the package has been placed within an approved delivery location or within a rejected delivery location. For example, where the package has been placed within a rejected delivery location, the user interface 420 can utilize the planar boundary box to identify the package (e.g., a red box overlaid onto an image of the package) within an image for the deliverer and provide delivery instructions to the deliverer for relocating the package within the delivery environment.

In some embodiments, the user device 402 can be configured to communicate with a server 404 via a wireless and/or wired connection. In particular, the user device 402 can receive, from the server 404, the delivery schedule 408 from the scheduling function 422, the one or more local algorithms 414 from the local algorithm storage function 424, and the global algorithms 416 from the global algorithm storage function 426. The server 404 can include a scheduling function 422 that is configured to generate a delivery path/route and a schedule of deliveries for the deliverer based on a plurality of packages to be delivered to one or more customers.

In some embodiments, the server 404 can be configured to generate, train, and maintain the local algorithms 414 of the local algorithm storage function 424 and the global algorithms 416 of the global algorithm storage function 426 via the algorithm maintenance function 428. In particular, the algorithm maintenance function can be configured to continuously, periodically, and/or aperiodically cause the local algorithms 414 and the global algorithms 416 to utilize previous delivery information 430 and customer feedback 432, as described above by FIGS. 1-3, to update associations between image features and delivery environments, packages, 3D positioning, and other elements of the local algorithms 414 and global algorithms 416. Due to the local algorithms 414 and global algorithms 416 being trained based on a plurality of evaluated data sets (e.g., an image of a package that has been determined to include a properly placed package within an intended delivery environment for a customer), incorporation of updated training data, and optionally weighting the updated training data more heavily than older training data, ensure consistent accuracy of the local algorithms 414 and global algorithms 416.

In some embodiments, the server 404 can be configured to utilize and train machine learning algorithms for storage as local algorithms 414 and global algorithms 416. The machine learning algorithms can be trained based on a plurality of training image pairs (e.g., a "new" picture that is compared against an "evaluated" picture, wherein the new image simulates and image captured by a user device 402 and the evaluated picture represents a picture that has been previously determined as associated with the intended delivery location) that are analyzed by the machine learning algorithms to determine whether a first picture, optionally captured by the user device 402, depicts the intended delivery environment of a second picture. As noted above, the machine learning algorithm can determine a score for how the first picture matches the second picture. The first picture can differ from the second picture in perspective, distance between sensor and the package/delivery environment, coloring, lighting, and other aspects. Accordingly, the machine learning algorithm can be configured to match the first picture and the second picture based on unique features such as door patterns, number, location, and orientation of windows, brick patterns, walls within the delivery environment, stairs within the delivery environment, etc. It should be noted that in some embodiments, the machine learning algorithm may evaluate only the similarity of the unique features between the first picture and the second picture and not identify the unique features themselves. Further, regions of high unique feature concentration may be identified by the machine learning algorithms and be utilized to expedite future matching of images to evaluated images by prioritizing the identification of high unique feature regions within new/incoming images.

Figure 5:
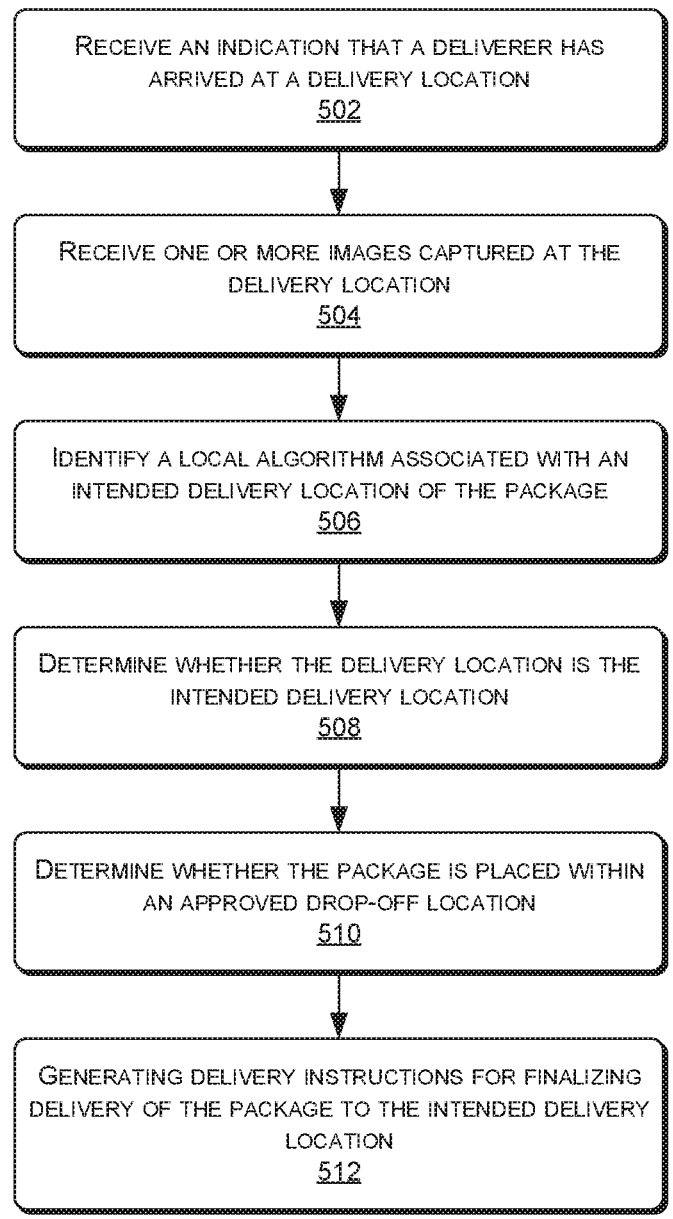
FIG. 5 illustrates an example flow diagram that describes delivery of a package to an approved drop-off location and verification that the package was delivered to the intended delivery location.

FIG. 5 illustrates an example flow diagram that describes delivery of a package to an approved drop-off location and verification that the package was delivered to the intended delivery location. It should be noted that the system described by FIG. 5 can be internal to a user device or a remote device in communication with the user device via wireless and/or wired communications.

At block 502, a system can receive an indication that a deliverer has arrived at a delivery location associated with a package. The indication can be manually sent by the deliverer upon arrival to the delivery location or automatically transmitted based upon the user device associated with the deliverer determining that the deliverer has arrived at the delivery location. For example, a GPS signal, WiFi fingerprinting, network locations, or other indications of user device location may be provided for determining whether the deliverer has arrived at the delivery location.

At block 504, the system can receive one or more images associated with the delivery location, wherein the one or more images depict at least the package placed at the delivery location. In some embodiments, the deliverer can provide the one or more images, a video, audio data, and other delivery location information upon arrival to the delivery location and/or after placement of the package at the delivery location. In some additional embodiments, the user device can activate one or more sensors to generate the one or more images, the video, the audio data, and other delivery location information upon arrival to the delivery location. It should be noted that the delivery location information can be collected by the user device on a continuous, periodic, and/or aperiodic basis.

At block 506, the system can identify, based on an intended delivery location, a local algorithm configured to verify that the delivery location depicted by the one or more images matches the intended delivery location for the package. In particular, the local algorithm associated with the intended delivery location can be configured to compare the one or more images of the delivery location with one or more additional images associated with the intended delivery location. Additionally, the local algorithm can be configured to identify unique features associated with the one or more images and additional unique features associated with the one or more additional images. Further, the local algorithm can determine an image matching score based at least on a comparison of the unique features and the additional unique features.

At block 508, the system can determine, based on the local algorithm associated with the intended delivery location, that the delivery location depicted by the one or more images is the intended delivery location. Continuing from block 506, the system can determine that the delivery location associated with the one or more images is the intended delivery location of the one or more additional images based at least on the image matching score exceeding a threshold. Alternatively, the local algorithm can determine that the image matching score for the delivery location and the intended delivery location exceeds one or more additional image matching scores between the delivery location and one or more additional delivery locations (e.g., neighboring delivery locations). In some additional embodiments, the local algorithm can determine that the image matching score indicates that the delivery location is not the intended delivery location, but is instead a neighboring delivery location or other nearby delivery location. Accordingly, the system can generate, and provide to the deliverer, navigation instructions to relocate from the delivery location to the intended delivery location.

At block 510, the system can determine, based on the local algorithm and a global algorithm, whether the package is placed within an approved drop-off location at the delivery location. In particular, the local algorithm can identify one or more approved delivery locations and one or more rejected delivery locations for the delivery location. Additionally, the global algorithm can be configured to identify whether a placed package is within the location information collected by the user device. The global algorithm can further be configured to determine a location of the placed package at the delivery location and determine, with the local algorithm, whether the location of the placed package falls within an approved delivery location or a rejected delivery location.

At block 512, the system can generate, based on the local algorithm and the global algorithm, one or more package delivery instructions for the delivery location. In particular, the package delivery instructions can cause the package to be relocated from a rejected delivery location to an approved delivery location. Alternatively, the delivery instructions can indicate that the delivery is ready for completion by the deliverer and that the placement of the package has been verified.

Figure 6:
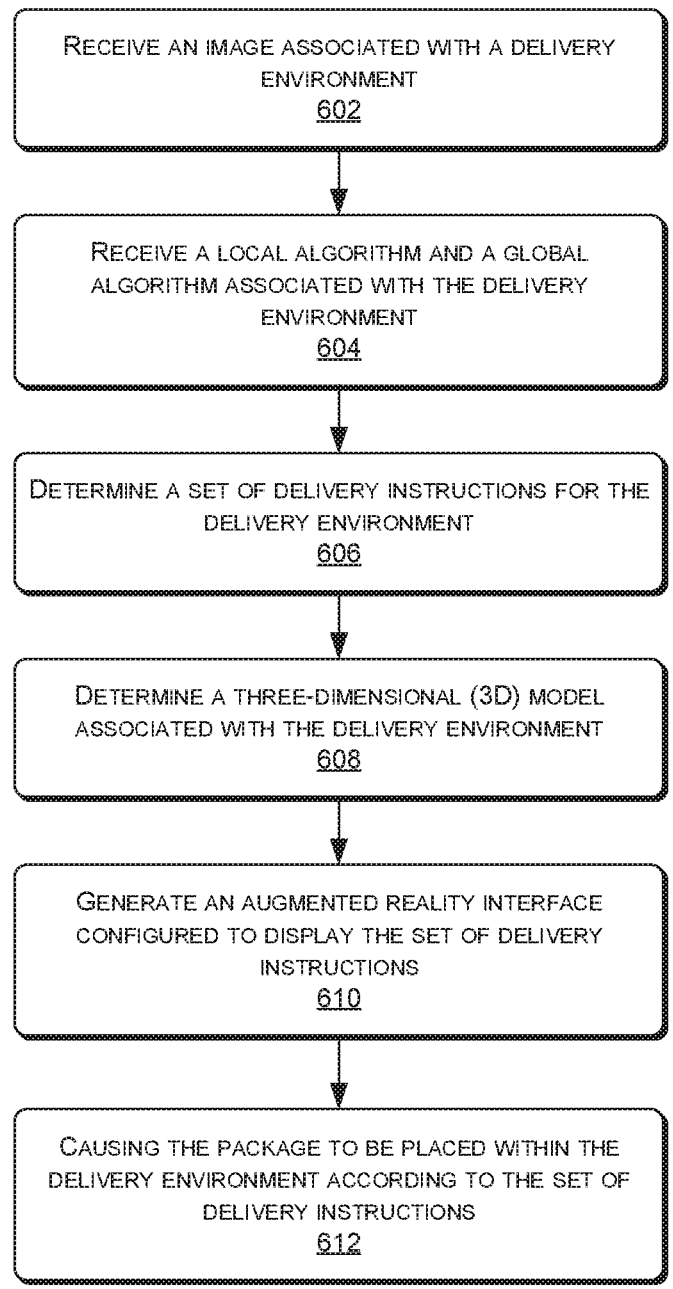
FIG. 6 illustrates an example flow diagram that describes a method for generating an augmented reality overlay that is presented to a deliver for verification of package placement at an intended delivery environment associated with a customer.

FIG. 6 illustrates an example flow diagram that describes a method for generating an augmented reality overlay for verifying package placement at an intended delivery environment associated with a customer.

At block 602, a method can include receiving an image associated with a delivery environment. In general, block 602 can be completed in a manner similar to those described above with respect to FIGS. 1-5.

At block 604, the method can include receiving a local algorithm configured to identify the delivery environment as an intended delivery environment and a global algorithm configured to verify placement of a package within the intended delivery environment. In general, block 604 can be completed in a manner similar to those described above with respect to FIGS. 1-5. In addition, the local algorithm and the global algorithm to be utilized at the delivery environment can be transmitted by the central service to the user device in response to a determination that the deliverer has arrived at the delivery location. As noted above, this indication can include a GPS signal, a network location associated with the user device, a deliverer provided indication, and other indications of deliverer and/or user device location. Accordingly, while the user device may be provided with the local algorithm and the global algorithm for all deliveries in a sequence of deliveries at a single time, the serve may also be configured to provide various local algorithms (e.g., associated with the intended delivery environment, neighboring delivery environments, nearby delivery environments) and global algorithms (e.g., package recognition, 3D modeling algorithms) upon arrival by the deliverer at the delivery environment.

At block 606, the method can include determining a set of delivery instructions for the delivery environment. In particular, a local algorithm associated with an intended delivery environment can be configured to determine whether the delivery environment is the intended delivery environment and generate the set of delivery instructions. Additionally, the set of delivery instructions can include delivery instructions for one or more delivery locations within the delivery environment. Further, the set of delivery instructions can identify approved delivery locations and rejected delivery locations, identified based at least on previous deliveries to the delivery environment and customer feedback, within the delivery environment.

At block 608, the method can include determining, based at least in part on the global algorithm, a three-dimensional (3D) model of the delivery environment. the 3D model generated by the global algorithm includes one or more features of the delivery environment, the one or more features comprising a package, an approved delivery location identified based at least in part on the set of delivery instructions, a rejected delivery location identified based at least in part on the set of delivery instructions, customer preference locations (e.g., locations where they customer prefers packages be delivered and/or locations where the customer experiences dissatisfaction with the delivery when packages are placed in the locations).

At block 610, the method can include generating an augmented reality interface configured to display the set of delivery instructions via the user device. In particular, a system and/or the user device can receive, from a camera of the user device, substantially real-time video of the delivery environment. Additionally, the system (or use device) can utilize the substantially real-time video of the delivery environment to generate, based at least in part on the set of delivery instructions, a modified video feed. The modified video feed can include the substantially real-time video that has been modified to include at least an approved delivery location and a rejected delivery location. Additional information associated with the delivery location can also be provided via the modified video feed such as customer preferences regarding delivery location. Further, the modified video feed can be updated with the delivery instructions in substantially real-time as a perspective of the user device and/or the deliverer changes. Accordingly, the modified video feed can be displayed, via a user interface of the user device, for the deliverer as the augmented reality interface/overlay. In some additional embodiments, the augmented reality interface can be further configured to identify the package within the delivery environment and provide indications that the package has been placed within the approved delivery location and that the delivery can be completed.

At block 612, the method can include causing the package to be placed within the delivery environment at a delivery location of the one or more delivery locations. In some embodiments, where the package has been successfully placed within an approved delivery location, the deliverer can be instructed to complete the delivery at the delivery environment and proceed to the next delivery. In some additional embodiments, causing the package to be placed within the delivery location can include determining, based at least on in part on the image and/or the video captured by the user device, that the package is placed within a rejected delivery location. Additionally, the augmented reality overlay can be configured to include an indication that the package is to be relocated from the rejected delivery location to an approved delivery location. Further, the augmented reality overlay can be updated based on a determination that the package has been effectively relocated to the approved delivery location. Accordingly, the placement of the package within the intended delivery environment can be verified and the delivery operation completed.

Figure 7:
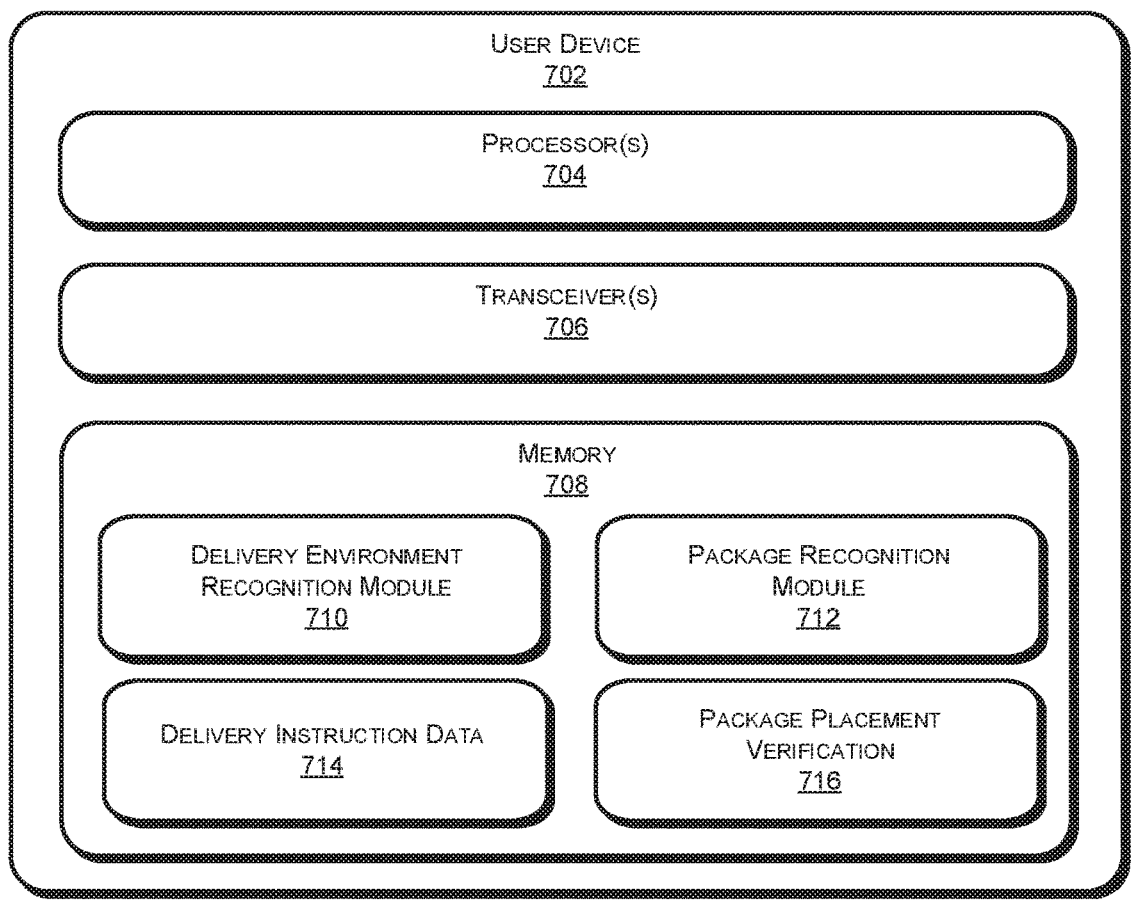
FIG. 7 illustrates a block diagram of a user device configured to determine whether a package has been placed at a delivery location for a customer and verifies that the package has been appropriately placed at the delivery location.

FIG. 7 illustrates a block diagram of a user device configured to determine whether a package has been placed at a delivery location for a customer and verifies that the package has been appropriately placed at the delivery location. In some embodiments, system 702 can interact with or correspond to any of the systems and/or implement the methods discussed in FIGS. 1-6. As illustrated, system 702 is generally comprised of one or more processors 704, one or more transceivers 706, and memory 708.

In some embodiments, the one or more processors 704 can include one or more central processing units (CPUs), one or more graphics processing units (GPUs), both CPUs and GPUs, or other processing units or components known in the art. For example, the one or more processors can include one or more processing units configured as controllers, microcontrollers, computational devices, microprocessors, and/or other computational devices configured to control and/or cause a user device to execute the operations described above.

In some embodiments, the one or more transceivers 706 can include one or more wired or wireless transceivers. For instance, the transceivers 708 can include a network interface card, a network adapter, a LAN adapter, an address associated with a network connection, or another device permitting communications to be sent and received. Additionally, the one or more transceivers 708 can comprise any wireless transceiver capable of engaging in wireless, radio frequency (RF) communication. Further, the one or more transceivers 708 can also include other wireless modems, such as Wi-Fi, WiMAX, Bluetooth, and/or infrared communication modems. Accordingly, the one or more transceivers 708 can be configured to transmit input parameters, feedback reports, the baseline solution, and the one or more candidate solutions between a user device and the solution generation and qualification system.

In some embodiments, memory 708 can be volatile (such as RAM), non-volatile (such as ROM, flash memory, etc.) or some combination of the two. The memory 708 may include removable storage, non-removable storage, and other forms of computer-readable media including, but not limited to RAM, ROM, EEPROM, flash memory, other memory technologies, CD-ROM, DVDs, content-addressable memory (CAM), other optical storage, magnet storage, and any other medium which can be used to store the desired information in a format that the system 702 accesses during execution of the above methods and/or operation of the above systems. The memory 708 can comprise one or more modules that cause the processors to execute one or more instructions and perform the operations discussed above with respect to FIGS. 1-6. Further, the memory 708 can comprise additional modules that can be executed by the processors 704 and cause the processors 704 to perform additional operations associated with the system 702. The additional modules can comprise delivery environment recognition modules 710, package recognition modules 712, package delivery instruction data 714, and package placement verification modules 716.

In some embodiments, and as noted above, the memory 704 includes delivery environment recognition modules 710. In particular, the delivery environment recognition modules 710 can be configured to utilize local machine learning algorithms to identify unique features within an image of a delivery environment. Additionally, the delivery environment recognition module 710 can be configured to compare the unique features of the image with additional images associated with an intended delivery environment, neighboring delivery environments, and other nearby delivery environments to identify whether a deliverer has successfully reach an intended delivery location or if further instructions are necessary to place the package at the intended delivery location. Further, the delivery environment recognition module 710 can generate a matching score between the unique feature of the delivery environment and the other delivery environments being compared to the delivery environment. Accordingly, the delivery environment recognition module 710 can determine whether the delivery environment is the intended delivery environment, a neighboring delivery environment, and other delivery environment based at least on the match score exceeding a threshold or other match scores associated with the various delivery environment types (e.g., match score for the intended delivery environment is higher than the match score for the other types of delivery environments).

In some embodiments, memory 704 includes resource package recognition modules 712 that operate to identify the package within the image of the delivery environment. In particular, the package recognition module 712 can be configured to identify whether the package is within the image and, if the package is determined to be within the image, determine a location of the package within the delivery environment. As noted above, a 3D model of the delivery environment can be generated based at least on the image. Accordingly, the package recognition module 712 can determine the location of the package within the image and display a representation of the package at a corresponding location within the 3D model. The package recognition module 712 can be further configured to identify a package type and confirm that the correct package is being placed within the delivery environment based in part on package size, package markings, shipping labels, and other identifying features of the package.

In some embodiments, memory 704 includes delivery instruction data 714 that provides indications of approved delivery locations and rejected delivery locations. Additionally, the delivery instruction data 714 can include information regarding the reason for the classification of the approved delivery location and rejected delivery location to the deliverer. For instance, a first approved delivery location can be indicated as a preferred delivery location by the customer, wherein the first approved delivery location is to be given priority for package placement. However, the first approved delivery location may be unavailable, causing the package to be placed at a second approved delivery location within the delivery environment. Accordingly, the delivery instruction data 714 can be utilized to generate indication of where packages are to be placed within the delivery environment and directions for navigating to the delivery locations.

In some embodiments, memory 704 includes package placement verification 716. In particular, the package placement verification 716 can operate as final confirmation that the package has be appropriately placed within the delivery location. Additionally, the package placement verification 716 can determine that the package has been placed within an approved delivery location or that the deliverer has overridden the package placement verification 716 and provided a reason for the override. For example, a gate may be locked that prevents the deliverer from placing the package within an approved delivery location due to all approved delivery locations being within the gate. Accordingly, the deliverer can be permitted to place the package in an otherwise rejected location.

Although the subject matter presented herein has been described in language specific to computer structural features, methodological acts and computer readable media, it is to be understood that the subject matter defined in the appended claims is not necessarily limited to the specific features, acts, or media described herein. Rather, the specific features, acts and media are disclosed as example forms of implementing the claims. Moreover, the subject matter described above is provided by way of illustration only and should not be construed as limiting.

What is claimed is:

1. A system comprising:
one or more processors; and
a memory storing one or more instructions that are executable by the one or more processors to perform operations comprising:
receiving, from a user device associated with a deliverer, an indication that the deliverer has arrived at a delivery location at which a package is scheduled to be delivered;
receiving one or more images associated with the delivery location, wherein the one or more images depict at least the package placed at the delivery location;
identifying, based on an intended delivery location of the package, a local algorithm configured to:
compare the one or more images with one or more additional images that have been previously associated with the intended delivery location based on one or more successfully completed prior deliveries to the intended delivery location,
identify first unique features associated with the one or more images and second unique features associated with the one or more additional images, and
verify that the delivery location depicted by the one or more images matches the intended delivery location for the package;
determining, based on the local algorithm, that the delivery location depicted by the one or more images is the intended delivery location;
determining, based on the local algorithm and a global algorithm, whether the package is placed within an approved drop-off location at the delivery location, wherein the global algorithm is configured to:
identify the package at the delivery location based on the one or more images;
identify a package type of the package based on package size, package markings, and shipping labels,
identify the approved drop-off location at the delivery location based on the one or more images,
confirm, based on the identifying of the package type, that the package is a correct package, and
confirm, based on the confirming of the package being the correct package, that the correct package is placed in the approved drop-off location;
generating, based on the local algorithm and the global algorithm, one or more package delivery instructions for the delivery location;
causing, via the user device, display of an augmented reality interface, the augmented reality interface comprised of the one or more package delivery instructions overlaid onto the one or more images of the delivery location displayed via the user device; and
transmitting an additional indication that the package has been delivered at the approved drop-off location associated with the delivery location.

2. The system as recited in claim 1, wherein the indication that the deliverer has arrived at the delivery location is generated based on at least one of:
determining, based on a global position system (GPS), that the user device is within a distance threshold of the delivery location; or
determining that a wireless fingerprint associated with the delivery location is detected by the user device.

3. The system as recited in claim 1, wherein the local algorithm is configured to:
determine an image matching score based on a comparison of the first unique features and the second unique features; and
determine that the delivery location is the intended delivery location based on the image matching score meeting or exceeding a threshold.

4. The system as recited in claim 1, wherein transmitting the additional indication causes the deliverer to proceed to a second delivery location to deliver a second package.

5. The system as recited in claim 1, wherein the one or more additional images are captured by a user device associated with a customer associated with the delivery location.

6. A method comprising:
receiving, from a user device, an image of a delivery environment;
determining a local algorithm associated with an intended delivery environment and a global algorithm configured to verify placement of a package within the intended delivery environment, the one or more additional images having been previously associated with the intended delivery environment based at least in part on one or more successfully completed prior deliveries to the intended delivery environment, and wherein the image of the delivery environment matches the one or more additional images further comprises:
- identifying one or more unique features associated with the image of the delivery environment, and
- determining that the one or more additional images include a set of the one or more unique features identified from the image;

determining, based at least in part on the local algorithm, whether the image of the delivery environment matches one or more additional images associated with the intended delivery environment;

generating an augmented reality interface configured to display the set of delivery instructions via the user device;

determining, based at least in part on the local algorithm, a set of delivery instructions for the delivery environment;

determining, based at least in part on the global algorithm, whether the package has been placed within the delivery environment, wherein the global algorithm is configured to:
- identify the package at the delivery environment based at least in part on the image,
- identify a package type of the package based at least in part on at last one of package size, one or more package markings, or one or more shipping labels,
- identify an approved delivery location at the delivery environment based at least in part on the image,
- confirm, based at least in part on the identifying of the package type, that the package is a correct package, and
- confirm, based at last in part on the confirming the package being the correct package, that the correct package is placed in the approved delivery location;

causing, based at least in part on the augmented reality interface, the package to be placed within the approved delivery location; and determining, based at least in part on the package being placed within the approved delivery location, that a delivery of the package is complete.

7. The method of claim 6, wherein receiving the image of the delivery environment further comprises:
- determining that the user device is within a threshold distance of the intended delivery environment; and
- causing the image of the delivery environment to be captured via the user device.

8. The method of claim 6, further comprising:
- generating, based at least in part on the set of the one or more unique features, an image matching score for the image and the one or more additional images; and
- determining that the image matching score is equal to or greater than a score threshold and that the delivery environment of the image is the intended delivery environment of the one or more additional images.

9. The method of claim 6, wherein determining whether the image of the delivery environment matches the one or more additional images further comprises:
- determining, based at least in part on the one or more unique features, that the one or more additional images are different from the image; and
- determining that the delivery environment associated with the user device is an incorrect delivery environment.

10. The method of claim 9, further comprising:
- determining, based at least in part on the one or more unique features, that the delivery environment is a neighboring delivery environment, wherein the neighboring delivery environment is within a distance threshold of the intended delivery environment; and
- generating, based at least in part on the delivery environment being a neighboring delivery environment, navigation instructions for relocating the user device to the intended delivery environment.

11. The method of claim 6, wherein determining the set of delivery instructions further comprises:
- identifying, via the local algorithm, one or more approved delivery locations within the delivery environment, wherein the one or more approved delivery locations are associated with the one or more successfully completed prior deliveries to the intended delivery environment; and
- identifying, via the local algorithm, one or more rejected delivery locations within the delivery environment, wherein the one or more rejected delivery locations are associated with one or more previous deliveries that include at least one indication that:
  - a delivery was received by a customer with damage; or
  - the delivery was otherwise completed at the intended delivery environment and not received by the customer.

12. The method of claim 11, wherein determining the set of delivery instructions further comprises:
- determining, based at least in part on the global algorithm, that the package is located within a rejected delivery location of the one or more rejected delivery locations; and
- causing the package to be relocated to an approved delivery location of the one or more approved delivery locations.

13. The method of claim 6, further comprising:
- determining a three-dimensional (3D) model of the delivery environment; and
- wherein generating the augmented reality interface is based at least in part on the image and the 3D model of the delivery environment.

14. The method of claim 6, further comprising: wherein the augmented reality interface is configured to:
- receive, from a camera of the user device, substantially real-time video of the delivery environment; and
- generate, based at least in part on the set of delivery instructions, a modified video feed that includes the substantially real-time video modified to include at least the approved delivery location and rejected delivery location.

15. A system comprising:
- one or more processors; and
- a memory storing one or more instructions that are executable by the one or more processors to perform operations comprising:
  - receiving, from a user device, an image of a delivery environment;
  - determining whether the image of the delivery environment matches one or more previous images of the delivery environment, the one or more previous images being associated with one or more successful deliveries to the delivery environment, and wherein determining whether the image of the delivery environment matches the one or more previous images further comprises:
   identifying one or more unique features associated with the image of the delivery environment; and
   determining that the one or more previous images include a set of the one or more unique features identified from the image;
determining, based at least in part on the image, a set of delivery instructions for the delivery environment, wherein the set of delivery instructions identifies one or more delivery locations within the delivery environment;
determining a three-dimensional (3D) model of the delivery environment;
generating, based at least in part on the image and the 3D model of the delivery environment, an augmented reality interface, wherein the augmented reality interface is configured to display the set of delivery instructions via the user device;
determining a global algorithm configured to verify placement of a package within an approved delivery location of the one or more delivery locations, wherein the global algorithm is configured to:
   identify the package at the delivery environment based at least in part on the image,
   identify a package type of the package based at least on at least one of package size, one or more package markings, or one or more shipping labels,
   identify the approved delivery location based at least in part on the image,
   confirm, based at least in part on the identifying of the package type, that the package is a correct package, and
   confirm, based at least in part on confirming of the package being the correct package, that the correct package is placed in the approved delivery location; and
causing, based at least in part on the augmented reality interface, a package to be placed within the delivery environment at an approved delivery location of the one or more delivery locations according to the set of delivery instructions.

16. The system as recited in claim 15, wherein the one or more delivery locations include at least one of the approved delivery location or a rejected delivery location within the image of the delivery environment.

17. The system as recited in claim 15, wherein the 3D model includes one or more features of the delivery environment, the one or more features comprising:
   the package;
   the approved delivery location identified based at least in part on the set of delivery instructions; and
   a rejected delivery location identified based at least in part on the set of delivery instructions.

18. The system as recited in claim 15, wherein the augmented reality interface is configured to:
   receive, from a camera of the user device, substantially real-time video of the delivery environment;
   generate, based at least in part on the set of delivery instructions, a modified video feed that includes the substantially real-time video modified to include at least the approved delivery location and a rejected delivery location; and
   display, via a user interface of the user device, the modified video feed.

19. The system as recited in claim 18, wherein the augmented reality interface is further configured to:
   identify the package within the modified video feed associated with the delivery environment; and
   indicate that the package has been placed within the approved delivery location and that a delivery is complete.

20. The system as recited in claim 18, wherein causing the package to be placed at the approved delivery location further comprises:
   determining, based at least on in part on the substantially real-time video, that the package is placed within the rejected delivery location;
   generating the augmented reality interface to include an indication that the package is to be relocated from the rejected delivery location to the approved delivery location;
   and determining that the package has been relocated to the approved delivery location.

\* \* \* \* \*